(12) United States Patent
Naito

(10) Patent No.: US 8,248,676 B2
(45) Date of Patent: Aug. 21, 2012

(54) OPTICAL SCANNING UNIT AND COLOR IMAGE FORMING APPARATUS USING THE SAME

(75) Inventor: Yuuta Naito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 508 days.

(21) Appl. No.: 12/582,317

(22) Filed: Oct. 20, 2009

(65) Prior Publication Data

US 2010/0097664 A1   Apr. 22, 2010

(30) Foreign Application Priority Data

Oct. 20, 2008 (JP) .................................. 2008-269549

(51) Int. Cl.
*H04N 1/04* (2006.01)
(52) U.S. Cl. ......... 358/481; 358/482; 358/401; 358/474
(58) Field of Classification Search .................. 358/481, 358/482, 474, 1.3, 401
See application file for complete search history.

(56) References Cited

U.S. PATENT DOCUMENTS 6,914,620 B2 * 7/2005 Yoshida et al. ............... 347/235
7,598,972 B2 * 10/2009 Tomita .......................... 347/235

FOREIGN PATENT DOCUMENTS

JP        2002-250880 A    9/2002

* cited by examiner

*Primary Examiner* — Houshang Safaipour
(74) *Attorney, Agent, or Firm* — Rossi, Kimms & McDowell LLP

(57) ABSTRACT

A color image forming apparatus obtaining a high quality color image with little write start misregistration among optical scanning devices, includes a plurality of optical scanning devices respectively including an incident optical unit guiding a light beam from a light source unit to a deflection unit, an imaging optical system allowing the light beam deflectively scanned by the deflection unit to be focused on a scanned surface, and an optical system for synchronous detection for adjusting image start timing on the scanned surface by using a part of the light beam deflectively scanned by the deflection unit. A ratio of a focal length of the optical system for synchronous detection to a focal length of the imaging optical system is set appropriately in a main scanning section of the plurality of optical scanning devices for obtaining a black color image and color images other than the black color image.

11 Claims, 8 Drawing Sheets

LONGITUDINAL
DIRECTION OF
SCANNING LENS (Y)

OPTICAL AXIS
DIRECTION OF
SCANNING LENS (X)

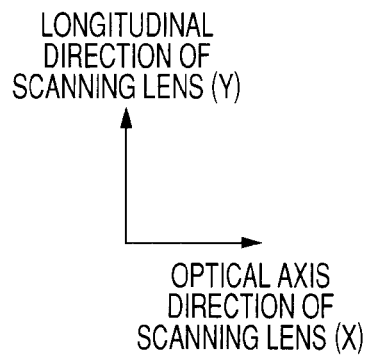
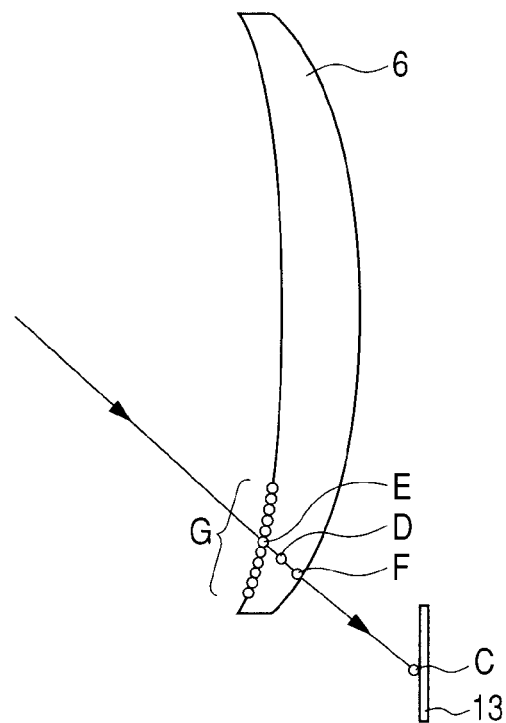
FIG. 7C
FIG. 7D
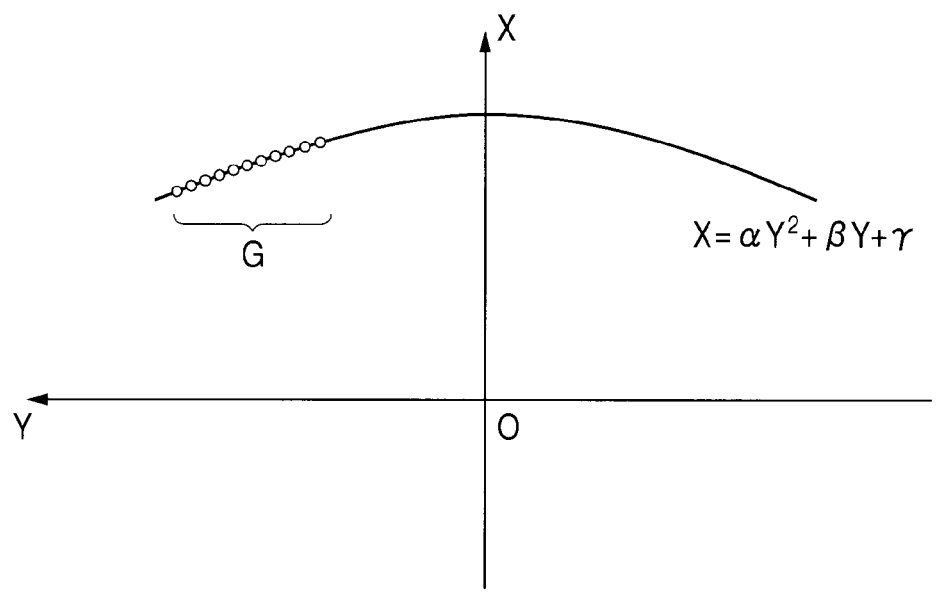

OPTICAL SCANNING UNIT AND COLOR IMAGE FORMING APPARATUS USING THE SAME

BACKGROUND OF THE INVENTION

1. Field of the Invention

The present invention relates to a color image forming apparatus suitable for an image forming apparatus such as a laser beam printer, a digital copying machine, or a multi-function printer, which adopts an electrophotography process.

2. Description of the Related Art

Conventionally, in an optical scanning device such as a laser beam printer (LBP), a light source unit modulates optically a light beam according to an image signal and emits the light beam, which is periodically deflected by a deflection unit that includes a rotation polygon mirror. Then, the deflected light beam is condensed so as to form a light spot on a surface of a photosensitive recording medium (photosensitive drum) via an imaging optical system having an fθ characteristics, whereby the surface of the photosensitive recording medium is scanned with the light beam to record an image.

The above-mentioned optical scanning device is provided with a synchronization detection element (synchronous sensor) as an optical detector for adjusting a timing for starting image formation on the surface of the photosensitive drum before scanning the surface of the photosensitive drum with the light spot.

This synchronous sensor receives a light beam for synchronous detection (synchronous light beam) that is a part of the light beam deflected for scanning by the deflection unit. Then, a signal for synchronous detection is detected from an output signal of the synchronous sensor, and the start timing for recording the image on the surface of the photosensitive drum is adjusted based on the signal for synchronous detection.

As one type of such image forming apparatus, "tandem type color image forming apparatus" has been proposed conventionally in various manners (see Japanese Patent Application Laid-Open No. 2002-250880).

FIGS. 12A and 12B are schematic diagrams of main part of the tandem type color image forming apparatus disclosed in FIG. 1 of Japanese Patent Application Laid-Open No. 2002-250880.

As illustrated in FIGS. 12A and 12B, the tandem type color image forming apparatus includes units for forming electrostatic latent images on photosensitive drums 4K, 4C, 4M, and 4Y by scanning with light, and developing units for developing the formed electrostatic latent images, which are arranged in a "tandem type" manner as one unit in one direction. Then, the electrostatic latent images corresponding to yellow (Y), magenta (M), cyan (C), and black (BK) color component images are formed separately on the four photosensitive drums 4K, 4C, 4M, and 4Y. Further, those electrostatic latent images are developed with toner of corresponding colors so that toner images of different colors are obtained on the individual photosensitive drums 4K, 4C, 4M, and 4Y. Then, the toner images of four colors are transferred onto the surface of the same transfer paper and are fixed so that a color image is obtained.

Image quality that is required to the image forming apparatus (printing apparatus) utilizing an electrophotography process has been upgraded year by year. In particular, color displacement is an important issue for image quality in the color image forming apparatus.

One of causes of the color displacement is write start misregistrations of individual colors on the photosensitive drums. This is caused by a mounting error of a component in the apparatus, a shape error of a cabinet itself to which the components are mounted, or the like. As a result, a relative deviation occurs among write start timings of the individual colors, and hence write start positions of the individual colors are also deviated.

In order to decrease a deviation amount of the write start positions, it is useful to increase a focal length of an optical system for synchronous detection so that an influence (sensitivity) of a synchronous detection error affecting the imaging optical system is reduced.

If this method is adopted, however, the following problem may occur in case of the color image forming apparatus including a plurality of optical scanning devices having the same structure like the above-mentioned conventional example.

If a monochrome image is output, only the optical scanning device for black color is operated. For this reason, the optical scanning device for black color is generally used most frequently among the optical scanning devices of four colors for forming a color image. A difference of the frequency of use can be considered as a difference of an occurrence frequency of disturbance such as a temperature rise or vibration during the operation. As a result, therefore, the synchronous detection error in the optical scanning device for black color becomes the largest among synchronous detection errors in the optical scanning devices for colors other than the black color.

On the other hand, in these years, there is also a need of decreasing the focal length of the synchronous detection optical system so as to respond a request for downsizing the optical scanning device. In this case, the influence of the synchronous detection error may increase, and hence a deviation amount of the write start position may increase.

SUMMARY OF THE INVENTION

It is an object of the present invention to provide a color image forming apparatus that can obtain a high quality color image with little write start misregistration among optical scanning devices even if a disturbance such as a temperature rise or vibration occurs.

In order to achieve the object described above, an optical scanning unit according to an aspect of the present invention includes a plurality of optical scanning apparatuses each of which includes a light source unit, an incident optical system for allowing a light beam emerging from the light source unit to be made incident into a deflection unit, an imaging optical system for allowing the light beam deflected for scanning by a deflection surface of the deflection unit to be focused on a surface to be scanned, a synchronization detection element for detecting a part of the light beam deflected for scanning by the deflection surface of the deflection unit, and an optical system for synchronous detection for guiding the part of the light beam deflected for scanning by the deflection surface of the deflection unit to the synchronization detection element.

Further, in the optical scanning unit, a focal length in a main scanning section of an optical system for synchronous detection of an optical scanning apparatus for forming a black color image among the plurality of optical scanning apparatuses is denoted by fgBK (mm), and a focal length in the main scanning section of optical system for synchronous detection of optical scanning apparatuses for forming color image other than the black color image is denoted by fgs (mm), and then the following condition is satisfied.

$$fgs < fgBK$$

Note that, in the optical scanning unit described above, a focal length in the main scanning section of the imaging optical system of the optical scanning apparatus for forming the black color image among the plurality of optical scanning apparatuses is denoted by fBK (mm), a focal length in the main scanning section of the imaging optical system for forming the color images other than the black color image is denoted by fs (mm), and then the optical scanning apparatus for forming the black color image and the optical scanning apparatuses for forming the color image other than the black color image is preferred to satisfy the following condition.

$$1.0 < (fs/fgs)/(fBK/fgBK) < 6.0$$

Further, the optical scanning apparatus for forming the black color image and the optical scanning apparatuses for forming the color images other than the black color image is preferred to satisfy the following conditions.

$$1 < fs/fgs < 10$$

$$1 < fBK/fgBK < 10$$

Further, a color image forming apparatus according to an aspect of the present invention includes the optical scanning unit described above, and a plurality of photosensitive drums provided to individual surfaces to be scanned of the plurality of optical scanning apparatuses for forming different color images to each other.

Further, the color image forming apparatus is preferred to further include a printer controller for converting a color signal supplied from an external device into image data of different colors, and for supplying the data to the individual plurality of optical scanning apparatuses.

Further, in order to achieve the object described above, an optical scanning unit according to another aspect of the present invention includes a plurality of optical scanning apparatuses each of which includes a light source unit, an incident optical system for allowing a light beam emerging from the light source unit to be made incident into a deflection unit, an imaging optical system for allowing the light beam deflected for scanning by a deflection surface of the deflection unit to be focused on a surface to be scanned, a synchronization detection element for detecting a part of the light beam deflected for scanning by the deflection surface of the deflection unit, and an optical system for synchronous detection for guiding the part of the light beam deflected for scanning by the deflection surface of the deflection unit to the synchronization detection element.

Here, in the optical scanning unit, a focal length in a main scanning section of an optical system for synchronous detection of an optical scanning apparatus for forming a black color image among the plurality of optical scanning apparatuses is denoted by fgBK (mm), a focal length in the main scanning section of an imaging optical system of the optical scanning apparatus for forming the black color image is denoted by fBK (mm), a focal length in the main scanning section of optical system for synchronous detection of optical scanning apparatuses for forming color images other than the black color image is denoted by fgs (mm), and a focal length in the main scanning section of imaging optical system for forming the color image other than the black color image is denoted by fs (mm), and then the following condition is satisfied.

$$fBK/fgBK < fs/fgs$$

Further, in the optical scanning unit according to another aspect of the present invention, the optical scanning apparatuses for forming the color images other than the black color image is preferred to satisfy the following condition.

$$1.0 < (fs/fgs2)/(fBK/fgBK) < 6.0$$

Further, the optical scanning apparatus for forming the black color image and the optical scanning apparatuses for forming the color image other than the black color image is preferred to satisfy the following conditions.

$$1 < fs/fgs < 10$$

$$1 < fBK/fgBK < 10$$

Further, optical elements for synchronous detection constituting the optical system for synchronous detection of each of the plurality of optical scanning apparatuses is preferred to have the same optical performance.

Further, a color image forming apparatus according to another aspect of the present invention includes the optical scanning unit according to the another aspect described above and a plurality of photosensitive drums provided to individual surfaces to be scanned of the plurality of optical scanning devices for forming different color images to each other.

Further, the color image forming apparatus is preferred to further include a printer controller for converting a color signal supplied from an external device into image data of different colors, and for supplying the data to the individual plurality of optical scanning apparatuses.

According to the present invention, a color image forming apparatus that can obtain a high quality color image with little write start misregistration among optical scanning devices even if a disturbance such as a temperature rise or vibration occurs may be provided.

Further features of the present invention will become apparent from the following description of exemplary embodiments with reference to the attached drawings.

BRIEF DESCRIPTION OF THE DRAWINGS

FIG. 7C is a diagram illustrating a method of determining a composite focal length in Embodiment 1 of the present invention; and FIG. 7D is a diagram illustrating a method of determining a composite focal length in Embodiment 1 of the present invention.

DESCRIPTION OF THE EMBODIMENTS

Preferred embodiments of the present invention will now be described in detail in accordance with the accompanying drawings.

A color image forming apparatus of the present invention includes an incident optical unit for guiding light beam emerged from a light source unit to a deflection unit, and an imaging optical system for forming an image of the light beam deflected for scanning by the deflection unit on the scanned surface. Further, the color image forming apparatus uses a plurality of optical scanning devices having an optical system for synchronous detection for adjusting image start timing on a scanned surface by using a part of the light beam deflected for scanning by the deflection unit.

Further, a ratio between a focal length of the optical system for synchronous detection and a focal length of the imaging optical system is set appropriately in a main scanning section of the optical scanning device for obtaining a black color image and other color images except the black color image.

Hereinafter, embodiments of the present invention are described with reference to the attached drawings.

EMBODIMENT 1

Figure 1:
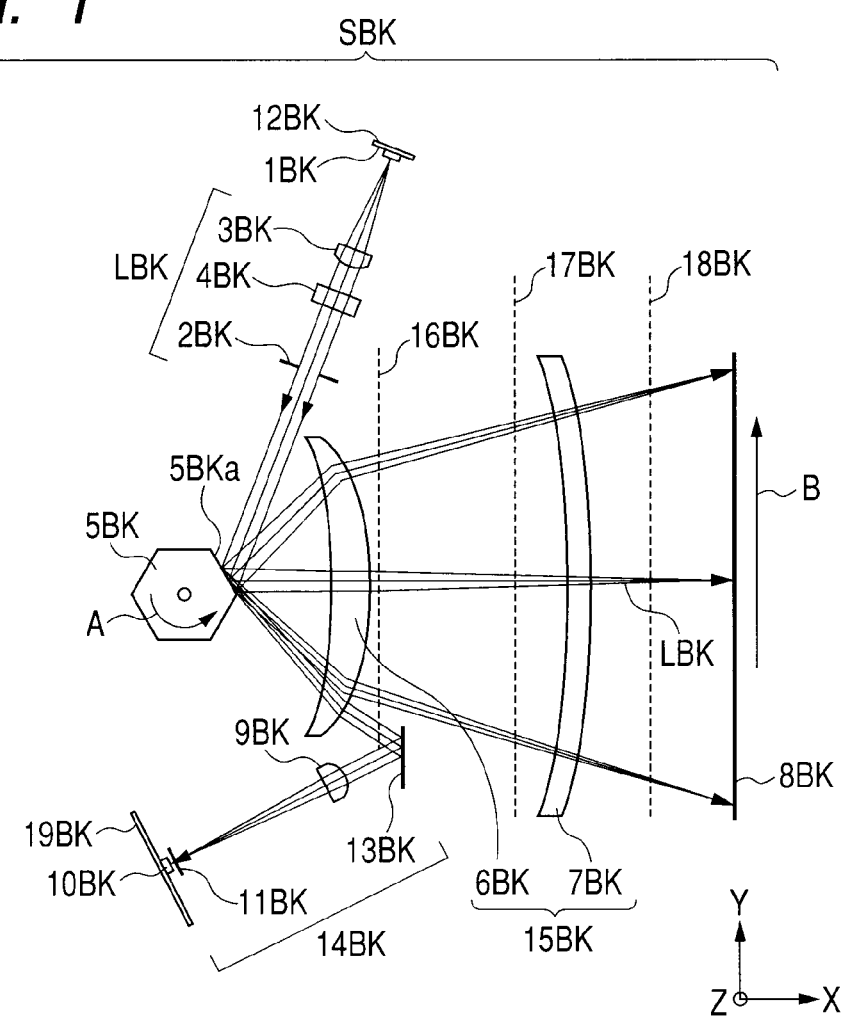
FIG. 1 illustrates a main scanning section (BK) of Embodiment 1 of the present invention.

FIG. 1 illustrates a cross section of a main part in the main scanning direction (main scanning section) of the optical scanning device for black color for obtaining a black color (black) image according to Embodiment 1 of the present invention.

In the description below, a sub-scanning direction (Z direction) is a direction parallel to a rotation axis of a deflection unit. A main scanning section is a section in which the sub-scanning direction (direction parallel to the rotation axis of the deflection unit) is a normal line. A main scanning direction (Y direction) is a direction in which light beams deflected for scanning by the deflection unit are projected on the main scanning section. A sub-scanning section is a section in which the main scanning direction is a normal line.

This embodiment uses a tandem type optical scanning unit in which four optical scanning devices are disposed in parallel corresponding to four colors of black (BK), yellow (Y), magenta (M), and cyan (C). Hereinafter, the four optical scanning devices are referred to as "optical scanning devices SBK, SY, SM, and SC".

For avoiding complexity in FIG. 1, only the optical scanning device SBK for black color that is one of the four optical scanning devices is illustrated. Further, reflection mirrors (16BK, 17BK, and 18BK) as bending mirrors that do not affect the optical performance are also omitted in FIG. 1.

Figure 2:
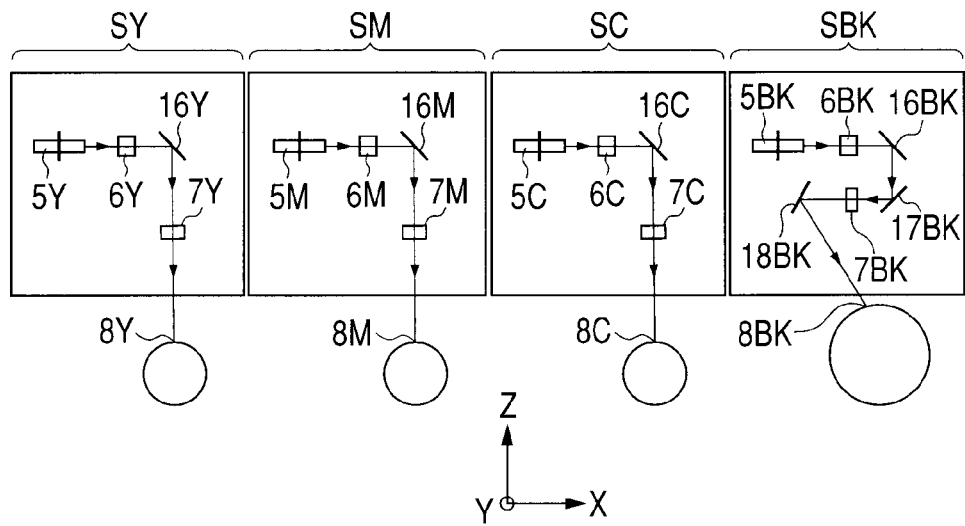
FIG. 2 illustrates a sub scanning section of Embodiment 1 of the present invention.

FIG. 2 illustrates a cross section of a main part in the sub-scanning direction (sub scanning section) of the four optical scanning devices SBK, SY, SM, and SC according to Embodiment 1 of the present invention. The unit having the four optical scanning devices SBK, SY, SM, and SC is defined as an optical scanning unit.

In FIG. 2, the optical scanning devices SY, SM, SC, and SBK corresponding to yellow (Y), magenta (M), cyan (C), and black (BK) are arranged in one direction in the stated order from the left side. In this embodiment, the optical scanning unit having a plurality of optical scanning devices is used for forming a color image.

Hereinafter, the general outlines of the optical scanning device are described with reference mainly to the optical scanning device SBK for black color illustrated in FIG. 1.

The optical scanning device SBK illustrated in FIG. 1 includes a light source unit 1BK, a first optical element 3BK, a second optical element 4BK, an aperture stop 2BK, and an optical deflector 5BK as the deflection unit. Further, the optical scanning device includes an imaging optical system (imaging lens system) 15BK for forming a light spot of the light beam from the optical deflector 5BK on a scanned surface 8BK.

In addition, the light source unit 1BK emits the light beam for optical scanning, and a semiconductor laser, a light emission diode, or the like can be used appropriately as the light source thereof.

The first optical element 3BK couples a condensed state of the light beam from the light source unit 1BK so that the light beam emitted from the light source unit 1BK is converted into a parallel light beam or a light beam having weak convergence or weak divergence. Hereinafter, the first optical element 3BK is also referred to as a "collimator lens".

The second optical element 4BK has an optical power (power) for refracting the light beam coupled by the first optical element 3BK only in the sub-scanning direction. Hereinafter, the second optical element 4BK is also referred to as a "cylindrical lens".

Note that individual elements including the collimator lens 3BK, the cylindrical lens 4BK, the aperture stop 2BK, and the like constitute the incident optical system (incident optical unit) LBK.

The optical deflector 5BK is a rotation polygon mirror that includes five surfaces, for example, and its circumcircle has a radius of 36 mm. The optical deflector 5BK is driven by a drive unit (not shown) such as a motor so as to rotate at a constant speed in a direction of the arrow A in FIG. 1.

The imaging optical system 15BK includes two imaging lenses 6BK and 7BK as imaging optical elements. The imaging optical system 15BK forms an image of the light beam deflected for scanning by the optical deflector 5BK like a light spot on the scanned surface 8BK. In addition, the imaging optical system 15BK has an optical face tangle error compensation function by forming a conjugate relationship between the deflection surface of the optical deflector 5 and the scanned surface 8BK in the sub scanning section. Each of the imaging lenses 6BK and 7BK is an aspherical plastic lens having high flexibility of design.

The optical system for synchronous detection (hereinafter, referred to as a "synchronous detection optical system") 14BK includes at least an imaging lens 6BK, and an optical element for synchronous detection (hereinafter, referred to as a "synchronous lens") 9BK. Further, the synchronous detection optical system 14BK includes a synchronization detection element (hereinafter, referred to as a "synchronous sensor") 10BK for obtaining a synchronizing signal (signal for synchronous detection), and a slit (hereinafter, referred to as a "synchronous slit") 11BK. Further, the synchronous detection optical system 14BK includes a second deflection unit (hereinafter, referred to as a "synchronous mirror") 13BK for guiding the light beam propagating toward the outside of the effective image region on the scanned surface 8BK after passing through the imaging lens 6BK by deflection to the synchronous sensor 10BK. Then, the synchronous detection optical system 14BK uses a part of the light beam deflected for scanning by the deflection unit 5BK so as to decide write start timing of the optical scanning device SBK on the scanned surface 8BK.

The structure of the synchronous detection optical system 14BK makes the light beam for synchronous detection (synchronous light beam) deflected for scanning by the deflection surface 5BKa focus on the surface of the synchronous slit 11BK. Then, the surface of the synchronous slit 11BK is scanned in the main scanning section. The deflection surface 5BKa and the synchronous slit 11BK are conjugate to each other in the sub scanning section, and hence the optical face tangle error compensation system for the deflection surface is realized.

The synchronous slit 11BK has an end portion like a knife edge, and incident timing in the synchronous sensor 10BK is measured so that a write start position of the image is determined. In addition, the synchronous light beam forms the image on the surface of the synchronous slit 11BK both in the main scanning direction and in the sub-scanning direction. Therefore, the spot diameter on the surface of the synchronous sensor 10BK is set to be larger than the spot diameter on the surface of the synchronous slit 11BK. Thus, sensitivity unevenness due to a manufacturing error of the synchronous sensor 10BK or sensitivity unevenness due to deposit of dust or the like can hardly be picked up.

In this embodiment, a principal ray of the light beam emitted from one light source unit 1BK enters the optical deflector 5BK in the direction of an angle of 70 degrees with respect to the optical axis LBK of the imaging optical system 15BK in the main scanning section. Note that Embodiment 1 describes the case using one light source unit 1BK, but two or more light source units may be used.

Note that the principal ray of the light beam corresponds to a light ray passing through the center of the aperture stop 2BK.

In this embodiment, the light source unit 1BK modulates optically the light beam according to image information and emits the light beam. Then, the light beam is converted into the parallel light beam or the light beam having weak convergence or weak divergence by the first optical element 3BK, so as to enter the second optical element 4BK. A part of the light beam entering the second optical element 4BK in the main scanning section passes through the aperture stop 2BK so as to emerge in the same state (while other part is shaded). Further, in the sub scanning section, a part of the light beam is converged and passes through the aperture stop 2BK (while other part is shaded), so as to form a line image (line image longitudinal in the main scanning direction) on the deflection surface 5BKa of the optical deflector 5BK.

Then, the light beam deflected for scanning on the deflection surface 5BKa of the optical deflector 5BK forms an image like a light spot on the photosensitive drum surface 8BK with the imaging optical system 15BK. Further, the optical deflector 5BK is driven to rotate in the direction of the arrow A, so that the photosensitive drum surface 8BK is optically scanned in the direction of the arrow B (main scanning direction) at a constant speed. Thus, the image is recorded on the photosensitive drum 8BK as the recording medium.

In this case, timing of the scanning start position on the photosensitive drum surface 8BK is adjusted before the photosensitive drum surface 8BK is optically scanned. For this reason, a part of the light beam (synchronous light beam) deflected for scanning by the deflection surface 5BKa of the optical deflector 5BK is reflected by the synchronous mirror 13BK and is guided to the synchronous sensor 10BK via the synchronous lens 9BK. The synchronous light beam to be used is a part deviating from the light beam for image formation on the "upstream side", i.e., on the starting side of writing the image with respect to the direction B in which the light spot formed on the scanned surface 8BK is scanned.

In the black color optical scanning device SBK of this embodiment, the angle formed between the principal ray of the synchronous light beam after being deflected for scanning by the optical deflector 5BK and the optical axis LBK of the imaging optical system 15BK in the main scanning section is set to be 53 degrees. In addition, the angle (scanning angle) formed between the principal ray of the light beam directed toward the endmost portion of the effective image region among light beams after being deflected for scanning by the optical deflector 5BK and the optical axis LBK of the imaging optical system 15BK in the main scanning section is set to be 48 degrees.

In addition, as illustrated in FIG. 2 as the sub scanning section, the light beam after being deflected for scanning by the optical deflector 5BK is bent by the three reflection mirrors (16BK, 17BK, and 18BK) and is focused so as to form a light spot on the photosensitive drum surface 8BK in the optical scanning device SBK.

The angle formed between the normal direction of the mirror surface and the incident light beam (incident angle) on the reflection mirror 16BK in the sub scanning section is set to be 46.5 degrees, the incident angle on the reflection mirror 17BK is set to be 43.5 degrees, and the incident angle on the reflection mirror 18BK is set to be 33.5 degrees.

On the other hand, in the optical scanning device SY, SM, or SC adjacent to the optical scanning device SBK as illustrated in FIG. 2, the light beam after being deflected for scanning by the optical deflector 5Y, 5M, or 5C is bent by respectively one reflection mirror 16 (16Y, 16M, or 16C). After that, the light beam is focused on the corresponding photosensitive drum surface 8 (8Y, 8M, or 8C) like a light spot. The angle (incident angle) formed between the normal direction of the mirror surface and the incident light beam on the reflection mirror 16Y, 16M, or 16C in the sub scanning section is set to be 46.5 degrees.

The number of reflection mirrors is different between the optical scanning device SBK and the optical scanning device SY, SM, or SC in the sub scanning section so that the difference of size of the photosensitive drum does not cause a difference of optical path length. In this embodiment, the photosensitive drum (8BK) for black (black color) has a diameter of 84 mm. On the other hand, the photosensitive drums (8Y, 8M, and 8C) for yellow, magenta, and cyan have a diameter of 30 mm.

Here, a deviation of the write start timing that causes color displacement in the tandem type image forming apparatus described above is considered with reference to FIG. 3 illustrating a schematic diagram of the main scanning section.

The deviation of the write start timing is obtained as a difference between the write start timing T0 as a design nominal obtained when passing through the synchronous slit and the write start timing T' obtained when the synchronous light beam of the actual optical scanning device passes through the synchronous slit. Here, when the deviation amount of the write start timing is denoted by $\Delta Ts$, the following equation holds.

$$\Delta Ts = T' - T0$$

The deviation amount ΔTs of the write start timing with respect to the design nominal is caused by factors including a mounting error of a component in the device, or a shape error of a cabinet itself to which the component is mounted due to a thermal distortion or the like.

Figure 3:
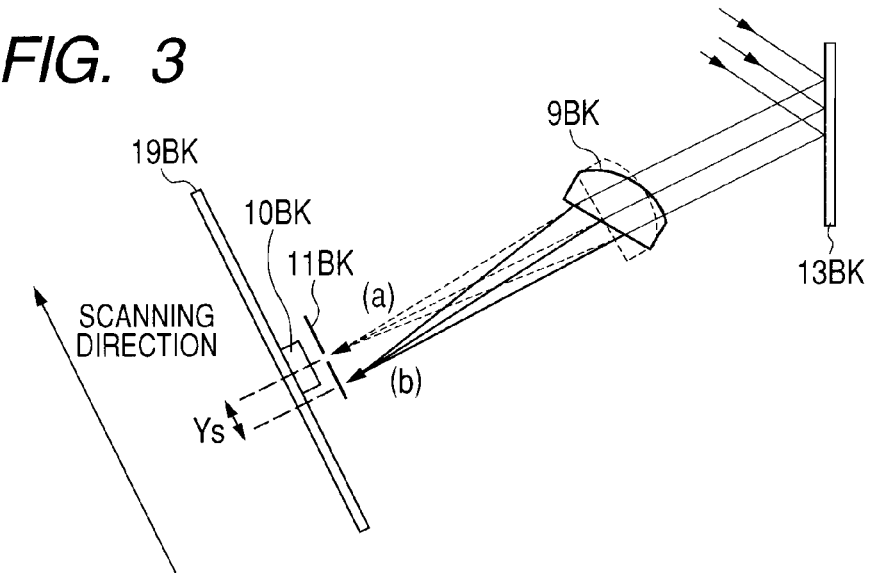
FIG. 3 is a diagram illustrating write start misregistration due to a set position error of a synchronous lens.

FIG. 3 illustrates a case as an example of a component mounting error, in which the synchronous lens 9BK in the optical system for synchronous detection of the optical scanning device SBK has an error in the rotational direction about the rotation axis in the direction perpendicular to the main scanning section. The synchronous light beam as design nominal is indicated by the broken line (a) in FIG. 3, and the synchronous light beam including the component mounting error is indicated by the solid line (b) in FIG. 3.

If the scanning direction is as illustrated in FIG. 3, the write start timing obtained from the actual synchronous light beam with respect to the write start timing at the nominal position is delayed by the deviation amount ΔTs. This exerts influence as a deviation of the write start timing on the photosensitive drum surface on which the electrostatic latent image is formed.

A write start misregistration amount Yd on the photosensitive drum surface in the main scanning section can be expressed by the following equation using three values including a write start misregistration amount Ys on the synchronous slit, a focal length f of the imaging optical system in the main scanning section, and a focal length fg of the optical system for synchronous detection in the main scanning section.

$$Yd = (f/fg) \times Ys$$

In other words, the more the value of f/fg is decreased, the more the absolute value of the write start misregistration amount Yd on the photosensitive drum surface can also be decreased. Therefore, in order to decrease the color displacement amount due to the write start misregistration of each color in the tandem type image forming apparatus, it is desirable to decrease a value of f/fg of the optical scanning devices SY, SM, SC, or SBK corresponding to each color Y, M, C, or BK.

In order to decrease the value f/fg in the above relationship equation, it is considered there are two methods. One is to decrease the focal length f of the imaging optical system in the main scanning section. The other is to increase the focal length fg of the optical system for synchronous detection in the main scanning section.

If the former method of decreasing the focal length f of the imaging optical system in the main scanning section is used, there is a difficulty that it is necessary to set the scanning angle larger for printing in the same effective image region, and hence interference with other components may occur easily.

On the other hand, if the latter method of increasing the focal length fg of the optical system for synchronous detection in the main scanning section is used, the optical system for synchronous detection is apt to have a large structure, and hence this method is disadvantageous for realizing a compact device as a whole.

Here, there is a disturbance factor such as vibration or a temperature rise as one of factors that cause a component mounting error and a shape error of the cabinet in the tandem type image forming apparatus of this embodiment. In other words, at the time of the assembly of the optical scanning device, even if the manufacturing or adjustment of the optical scanning device is performed so that the write start misregistration amount becomes substantially zero, the component mounting error or the shape error of the cabinet may occur due to the disturbance factor that may occur every time when the device is used. The write start misregistration amount caused by a disturbance factor such as vibration or a temperature rise is affected by a frequency of use.

In general, the frequency of use of the optical scanning device for black color that is also used for forming a monochrome image is higher than the frequency of use of the optical scanning device for yellow, magenta, or cyan that is used only for forming a color image. For this reason, the relationships between the write start misregistration amount Ys(BK) of the optical scanning device SBK for black color on the synchronous slit and the write start misregistration amount Ys(Y), Ys(M), or Ys(C) of the optical scanning device SY, SM, or SC for a color other than the black color on the synchronous slit becomes as follows.

$$Ys(BK) > Ys(Y)$$

$$Ys(BK) > Ys(M)$$

$$Ys(BK) > Ys(C)$$

Further, in the conventional example in which the value of f/fg of the individual optical scanning devices SY, SM, SC, and SBK has a constant value, the following relationships are derived.

$$Yd(BK) > Yd(Y)$$

$$Yd(BK) > Yd(M)$$

$$Yd(BK) > Yd(C)$$

Note that Yd(BK), Yd(Y), Yd(M), and Yd(C) respectively denote the write start timing misregistration amount of the optical scanning devices SBK, SY, SM, and SC on the photosensitive drum surface in the stated order.

As described above, the write start timing misregistration amount Yd(BK) of the optical scanning device SBK for black color on the photosensitive drum surface becomes largest in the tandem type color image forming apparatus including four color toner images of yellow, magenta, cyan, and black. Therefore, as a result, the color displacement amount when the four color toner images are superimposed becomes large.

Therefore, in this embodiment, in order to set the write start misregistration amount Yd(BK) of the optical scanning device SBK for black color on the photosensitive drum surface to be smaller than the write start misregistration amount of the optical scanning devices SY, SM, and SC for other colors, the following conditional expression (1) is satisfied.

Specifically, the optical scanning device SBK for obtaining a black color image among the plurality of optical scanning devices SY, SM, SC, and SBK has a focal length fgBK of the optical system for synchronous detection from the optical deflector to the synchronous sensor in the main scanning section. In addition, the focal length of the imaging optical system in the main scanning section is denoted by fBK. Further, in the optical scanning devices SY, SM, and SC for obtaining color images other than the black color image, the focal length of the optical system for synchronous detection from the optical deflector to the synchronous sensor in the main scanning section is denoted by fgs. In addition, the focal length of the imaging optical system in the main scanning section is denoted by fs. Then, the following conditional expression (1) is satisfied.

$$fBK/fgBK < fs/fgs \qquad (1)$$

The above-mentioned conditional expression (1) is satisfied in this embodiment, and hence the absolute value of the deviation amount in the optical scanning device SBK for black color, which exerts the influence the most on the write start misregistration, is set to be smaller than the write start misregistration amount of the optical scanning device SY, SM, or SC of other colors. Thus, a relative deviation amount among the four colors when the four colors are superimposed can be decreased so that the color displacement amount can be controlled to be small.

Further, in this embodiment, only for the optical scanning device SBK for black color, the value of the focal length fgBk of the optical system for synchronous detection in the main scanning section is set to be larger than the value of the focal length fgs of the optical scanning devices SY, SM, and SC for other colors. Thus, downsizing of the whole device can be achieved compared with the case in which the value of the focal length fg of the optical system for synchronous detection in the main scanning section is increased for all the four colors.

In order to achieve both a small color displacement amount and downsizing of the whole device, this embodiment satisfies the two conditions as follows.

As a first condition, the conditional expression (2) described below is satisfied.

Specifically, a ratio between the focal length fBK of the imaging optical system in the main scanning section of the optical scanning device SBK for forming a black color image and the focal length fgBK of the optical system for synchronous detection is denoted by fBK/fgBK. In addition, a ratio between the focal length fs of the imaging optical system in the main scanning section of the optical scanning device SY, SM, or SC for forming a color image other than the black color image and the focal length fgs of the optical system for synchronous detection is denoted by fs/fgs. Then the following conditional expression is satisfied.

$$1.0 < (fs/fgs)/(fBK/fgBK) < 6.0 \quad (2)$$

Being lower than the lower limit value of the conditional expression (2) is not desirable because the optical system for synchronous detection becomes larger in size. In addition, being larger than the upper limit value of the conditional expression (2) is not desirable because the write start misregistration amount on the photosensitive drum surface becomes larger.

It is more desirable to modify the above-mentioned conditional expression (2) as follows.

$$1.0 < (fs/fgs)/(fBK/fgBK) < 5.0 \quad (2a)$$

As a second condition, the following conditional expressions (3) and (4) are satisfied.

Specifically, a ratio between the focal length fs of the imaging optical system in the main scanning section of the optical scanning device SY, SM, or SC for forming a color image other than the black color image and the focal length fgs of the optical system for synchronous detection is denoted by fs/fgs. In addition, a ratio between the focal length fBK of the imaging optical system in the main scanning section of the optical scanning device SBK for forming the black color image and the focal length fgBK of the optical system for synchronous detection is denoted by fBK/fgBK. Then the following conditional expressions are satisfied.

$$1 < fs/fgs < 10 \quad (3)$$

$$1 < fBK/fgBK < 10 \quad (4)$$

Being lower than the lower limit value of at least one of the conditional expressions (3) and (4) is not desirable because the optical system for synchronous detection becomes larger in size. In addition, being larger than the upper limit value of at least one of the conditional expressions (3) and (4) is not desirable because the write start misregistration amount on the photosensitive drum surface becomes larger.

It is more desirable to modify the above-mentioned conditional expressions (3) and (4) as follows.

$$1 < fs/fgs < 8 \quad (3a)$$

$$1 < fBK/fgBK < 8 \quad (4a)$$

Hereinafter, the optical scanning devices SY, SM, SC, and SBK of the individual colors are described. The optical systems for synchronous detection of the optical scanning devices SY, SM, and SC have the completely same structure. Therefore, the optical scanning device SY for yellow color and the optical scanning device SBK for black color are described as representatives as follows.

Figure 4:
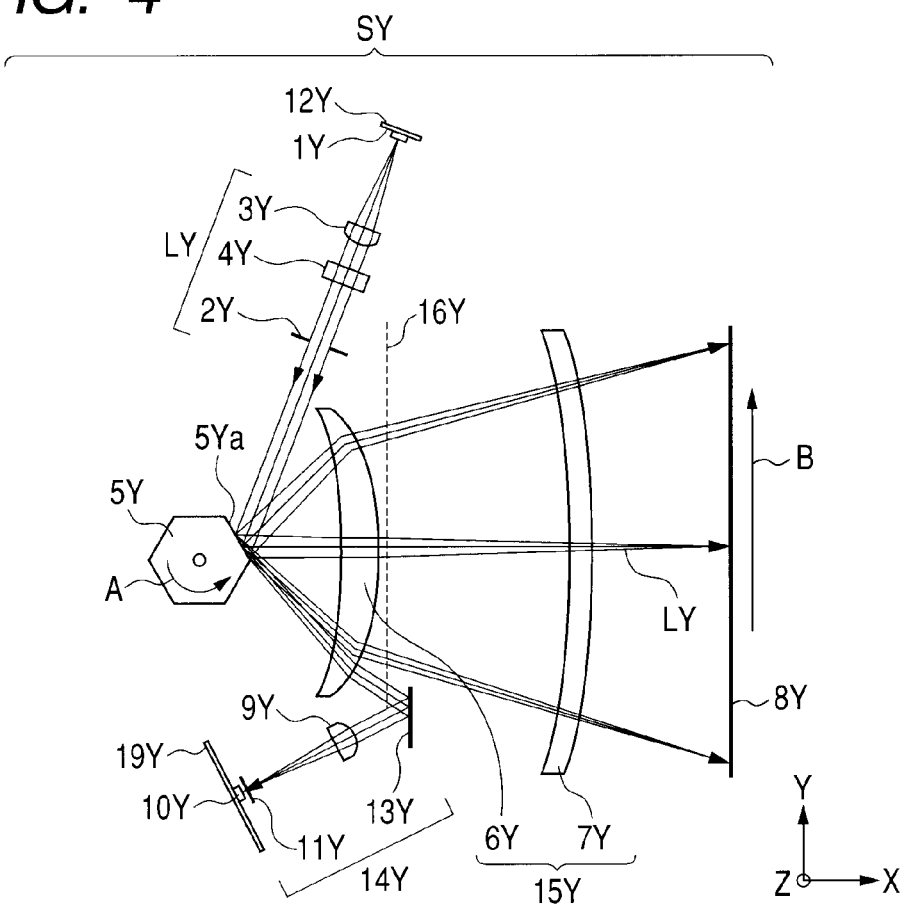
FIG. 4 illustrates a main scanning section (Y) of Embodiment 1 of the present invention.
Figure 5:
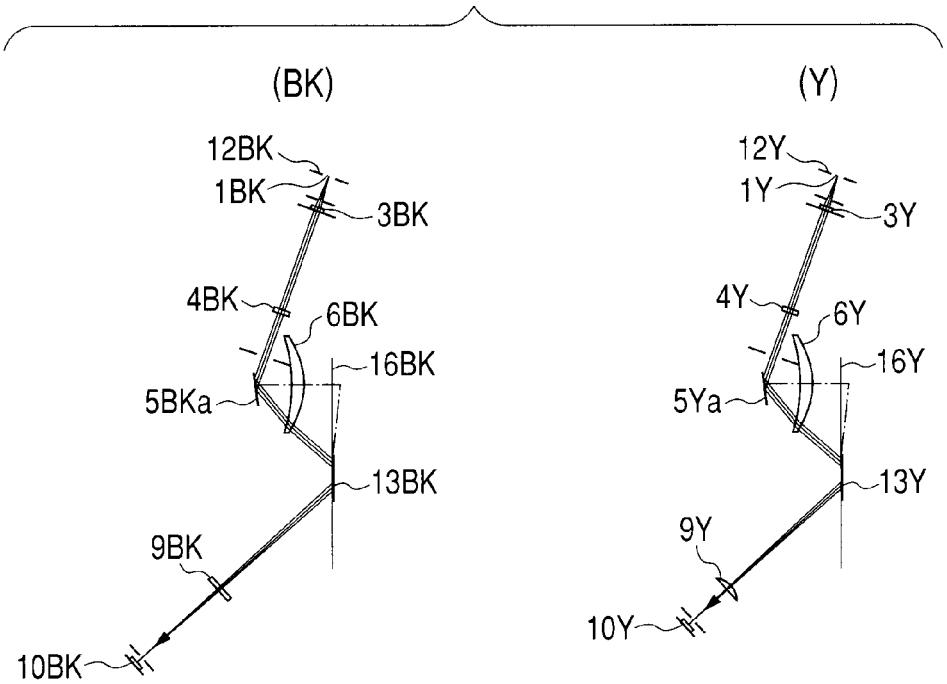
FIG. 5 illustrates a main scanning section of an optical system for synchronous detection of Embodiment 1 of the present invention.
Figure 6:
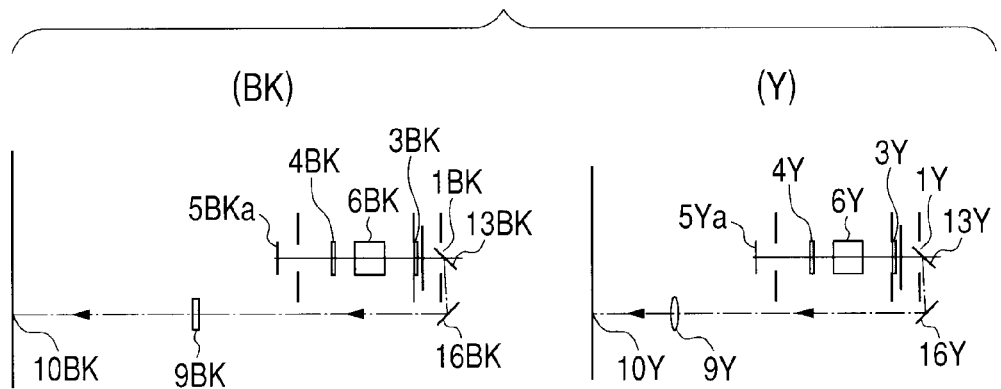
FIG. 6 illustrates a sub scanning section of the optical system for synchronous detection of Embodiment 1 of the present invention.

FIG. 4 illustrates the main scanning section of the optical scanning device SY for yellow color according to Embodiment 1 of the present invention. FIG. 5 illustrates the main scanning sections of the optical systems for synchronous detection of the optical scanning device SBK for black color and the optical scanning device SY for yellow color according to Embodiment 1 of the present invention. FIG. 6 illustrates the sub scanning sections of the optical systems for synchronous detection of the optical scanning device SBK for black color and the optical scanning device SY for yellow color according to Embodiment 1 of the present invention.

In this embodiment, the imaging lenses 6 (6BK or 6Y) and 7 (7BK or 7Y) that are disposed on the optical deflector side and the synchronous lens 9 (9BK or 9Y) are expressed by the following functions.

For instance, the direction that is orthogonal to the optical axis of the imaging lenses 6 (6BK or 6Y), 7 (7BK or 7Y), and the synchronous lens 9 (9BK or 9Y) disposed on the optical deflector side in the main scanning section of the scanning start side and the scanning end side with respect to the optical axis is regarded as y-axis. In addition, the direction that is orthogonal to the optical axis in the sub scanning section is regarded as z-axis. Then, the surface shape on the scanning start side is expressed by the following equation.

$$x = \frac{y^2/R}{1+\sqrt{1-(1+K)(y/R)^2}} + B_{4s}y^4 + B_{6s}y^6 + B_{8s}y^8 + B_{10s}y^{10} \quad \text{Equation 1}$$

The surface shape on the scanning end side is expressed by the following equation.

$$x = \frac{y^2/R}{1+\sqrt{1-(1+K)(y/R)^2}} + B_{4e}y^4 + B_{6e}y^6 + B_{8e}y^8 + B_{10e}y^{10} \quad \text{Equation 2}$$

Here, R denotes the curvature radius. K, $B_4$, $B_6$, $B_8$, and $B_{10}$ denote aspherical coefficients. A suffix s of the coefficient indicates the scanning start side while e indicates the scanning end side.

Further, in the sub scanning section, the curvature is altered continuously on both sides, i.e., the incident surface and the emergence surface of the imaging lens 7 (7BK or 7Y) in the effective portion of the imaging lens 7 (7BK or 7Y).

The emergence surface (R4 surface) of the imaging lens 7 (7BK or 7Y) is constituted to have the largest optical power (power: reciprocal of focal length) among the lens surfaces constituting the imaging optical system.

The shapes of the imaging lens 6 (6BK or 6Y) and the synchronous lens 9 (9BK or 9Y) in the sub scanning section can be expressed by the following continuous functions. Here, on the scanning start side and the scanning end side with reference to the optical axis, the x-axis corresponds to the optical axis, the y-axis corresponds to the direction orthogonal to the optical axis in the main scanning section, and the z-axis corresponds to the direction orthogonal to the optical axis in the sub scanning section.

The surface shape of the scanning start side is expressed by the following equation.

$$S = \frac{z^2/r'}{1+\sqrt{1-(z/r')^2}}$$

$$r' = r(1 + D_{2s}y^2 + D_{4s}y^4 + D_{6s}y^6 + D_{8s}y^8 + D_{10s}y^{10})$$

Equation 3

The surface shape of the scanning end side is expressed by the following equation.

$$S = \frac{z^2/r'}{1+\sqrt{1-(z/r')^2}}$$

$$r' = r(1 + D_{2e}y^2 + D_{4e}y^4 + D_{6e}y^6 + D_{8e}y^8 + D_{10e}y^{10})$$

Equation 4

Here, r' denotes the curvature radius of the sub-scanning direction. $D_2$, $D_4$, $D_6$, $D_8$, and $D_{10}$ denote aspherical coefficients.

Note that the curvature radius in the sub-scanning direction corresponds to a curvature radius in the cross section orthogonal to the shape (generatrix) in the main scanning direction.

The shapes of the imaging lens 7 (7BK or 7Y) in the sub scanning section can be expressed by the following continuous functions. Here, on the scanning start side and the scanning end side with respect to the optical axis, the x-axis corresponds to the optical axis, the y-axis corresponds to the direction orthogonal to the optical axis in the main scanning section. Further, the z-axis corresponds to the direction orthogonal to the optical axis in the sub scanning section.

The surface shape of the scanning start side is expressed by the following equation.

$$S = \frac{z^2/r'}{1+\sqrt{1-(z/r')^2}}$$

$$\frac{1}{r'} = \frac{1}{r} + (E_{2s}y^2 + E_{4s}y^4 + E_{6s}y^6 + E_{8s}y^8 + E_{10s}y^{10})$$

Equation 5

The surface shape of the scanning end side is expressed by the following equation.

$$S = \frac{z^2/r'}{1+\sqrt{1-(z/r')^2}}$$

$$\frac{1}{r'} = \frac{1}{r} + (E_{2e}y^2 + E_{4e}y^4 + E_{6e}y^6 + E_{8e}y^8 + E_{10e}y^{10})$$

Equation 6

Here, r' denotes the curvature radius of the sub-scanning direction. $E_2$, $E_4$, $E_6$, $E_8$, and $E_{10}$ denote aspherical coefficients.

Hereinafter, optical parameters in the optical scanning device SBK for black color and the optical scanning device SY for yellow color are shown in Tables 1, 2, and 3.

TABLE 1

| Wavelength, refractive index | | |
|---|---|---|
| Wavelength to be used (nm) | λ | 670 |
| Refractive index of scanning lenses 6 and 7 | Nd | 1.531 |
| Abbe number of scanning lenses 6 and 7 | vd | 55.5 |
| Refractive index of BD lens | Nd | 1.492 |
| Abbe number of BD lens | vd | 57.9 |
| Polygon | | |
| The number of surfaces | n | 5 |
| Diameter of circumcircle (mm) | φ | 34 |
| Angle of light beam | | |
| Incident angle at optical deflector in main scanning direction (degrees) | am | 70 |
| Incident angle at optical deflector in sub-scanning direction (degrees) | as | 0 |
| Maximum emerging angle from optical deflector in main scanning direction (degrees) | θ | ±48 |
| Synchronous detection angle (degrees) | θbd | −26.5 |
| Location | | |
| Deflection surface to first surface of scanning lens on optical deflector side (mm) | d01 | 26.5 |
| Thickness of scanning lens on optical deflector side (mm) | d12 | 9.6 |
| Second surface of scanning lens on optical deflector side to third surface of scanning lens on scanned surface side (mm) | d23 | 67.9 |
| Thickness of scanning lens on scanned surface side (mm) | d34 | 5.5 |
| Fourth surface of scanning lens on scanned surface side to scanned surface (mm) | d45 | 126.5 |
| Maximum effective diameter of scanning lens on optical deflector side (mm) | Y1max | 65.4 |
| Maximum effective diameter of scanning lens on scanned surface side (mm) | Y2max | 179.1 |
| Focal length of scanning lens (mm) | fp | 200 |
| Convergence degree of collimator | r0 | 1.00E+30 |
| Optical deflector to natural convergence point (mm) | | |
| Fourth surface of scanning lens on scanned surface side to bending mirror 16BK surface (mm) | d56bk | 40 |
| Fourth surface of scanning lens on scanned surface side to bending mirror 16Y, 16M or 16C surface (mm) | d56ymc | 44.2 |

TABLE 1-continued

| | | |
|---|---|---|
| Bending mirror 16BK surface to bending mirror 17BK surface (mm) | d67bk | 31.3 |
| Bending mirror 17BK surface to bending mirror 18BK surface (mm) | d78bk | 44.9 |
| Location of BD optical system | | |
| Optical path length from bending mirror surface to BD mirror surface [for BK] (mm) | t01bk | 25.2 |
| Optical path length from bending mirror surface to BD mirror surface [for Y, M, and C] (mm) | t01ymc | 21 |
| Optical path length from BD mirror surface to first surface of BD lens [for BK] (mm) | t12bk | 110 |
| Optical path length from BD mirror surface to first surface of BD lens [for Y, M, and C] (mm) | t12ymc | 110 |
| Thickness of BD lens (mm) | d89 | 3.5 |
| Optical path length from second surface of BD lens to BD slit [for BK] (mm) | t12bk | 69.9 |
| Optical path length from second surface of BD lens to BD slit [for Y, M, and C] (mm) | t12ymc | 23.8 |
| BD slit to BD sensor [for BK] (mm) | d910bk | 10 |
| BD slit to BD sensor [for Y, M, and C] (mm) | d910ymc | 10 |

TABLE 2

Surface shape of scanning lens on optical deflector side

| | First surface | | Second surface | |
|---|---|---|---|---|
| | Scanning start side (s) | Scanning end side (e) | Scanning start side (s) | Scanning end side (e) |
| R | −7.12E+01 | −7.12E+01 | −4.16E+01 | −4.16E+01 |
| K | 2.18E+00 | 2.18E+00 | 6.43E−02 | 6.43E−02 |
| B4 | 3.69128E−06 | 3.69128E−06 | 2.77878E−06 | 2.77878E−06 |
| B6 | 8.27275E−11 | 8.27275E−11 | 1.1798E−09 | 1.1798E−09 |
| B8 | 1.95633E−13 | 1.95633E−13 | 2.1027E−13 | 2.17551E−13 |
| B10 | 3.54758E−17 | 3.54758E−17 | 2.07452E−16 | 2.02442E−16 |
| r | −1.00E+03 | −1.00E+03 | −1.00E+03 | −1.00E+03 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

Surface shape of scanning lens on scanned surface side

| | Third surface | | Fourth surface | |
|---|---|---|---|---|
| | Scanning start side (s) | Scanning end side (e) | Scanning start side (s) | Scanning end side (e) |
| R | −8.24E+02 | −8.24E+02 | 7.68E+02 | 7.68E+02 |
| K | 0.00E+00 | 0.00E+00 | −5.90E+02 | −5.90E+02 |
| B4 | 0 | 0 | −2.57008E−07 | −2.57008E−07 |
| B6 | 0 | 0 | 2.17131E−11 | 2.17131E−11 |
| B8 | 0 | 0 | −1.47843E−15 | −1.47843E−15 |
| B10 | 0 | 0 | 4.78126E−20 | 4.78126E−20 |
| r | −1.00E+02 | −1.00E+02 | −2.36E+01 | −2.36E+01 |
| E2 | 0 | 2.45E−06 | 7.12999E−05 | 0.000124271 |
| E4 | 0 | −1.68E−10 | −1.56148E−08 | −1.47169E−08 |
| E6 | 0 | 0 | 2.05495E−12 | 2.74013E−12 |
| E8 | 0 | 0 | −1.46632E−16 | −2.99548E−16 |
| E10 | 0 | 0 | 4.25621E−21 | 1.07355E−20 |

TABLE 3

Surface shape of BD lens (for BK)

| | First surface | | Second surface | |
|---|---|---|---|---|
| | Scanning start side (s) | Scanning end side (e) | Scanning start side (s) | Scanning end side (e) |
| R | 77.5 | 77.5 | 1.00E+30 | 1.00E+30 |
| K | 0 | 0 | 0 | 0 |
| B4 | 0 | 0 | 0 | 0 |
| B6 | 0 | 0 | 0 | 0 |
| B8 | 0 | 0 | 0 | 0 |
| B10 | 0 | 0 | 0 | 0 |
| r | 77.5 | 77.5 | −35.0 | −35.0 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

Surface shape of BD lens (for Y, M, and C)

| | First surface | | Second surface | |
|---|---|---|---|---|
| | Scanning start side (s) | Scanning end side (e) | Scanning start side (s) | Scanning end side (e) |
| R | 16.0 | 16.0 | 1.00E+30 | 1.00E+30 |
| K | 0 | 0 | 0 | 0 |
| B4 | 0 | 0 | 0 | 0 |
| B6 | 0 | 0 | 0 | 0 |
| B8 | 0 | 0 | 0 | 0 |
| B10 | 0 | 0 | 0 | 0 |
| r | 16.0 | 16.0 | −28.0 | −28.0 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

In addition, here, a method of determining the focal length fg of the optical system for synchronous detection in the main scanning section (main scanning direction) is described with reference to FIGS. 7A to 7D.

Figure 7A:
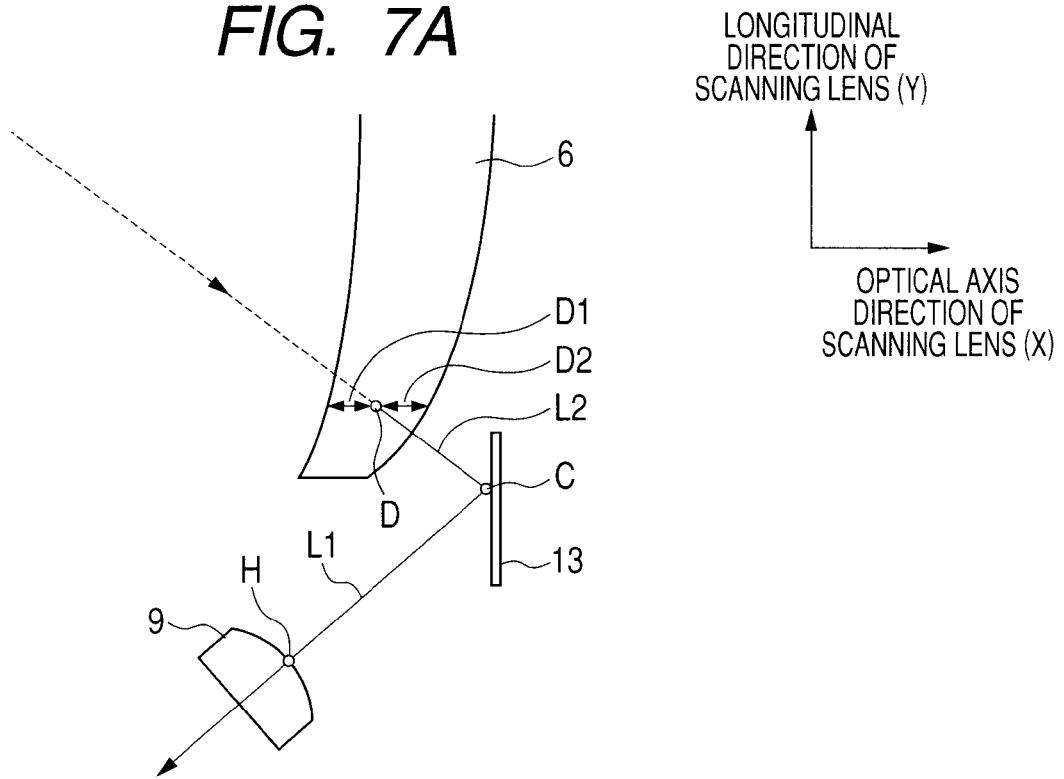
FIG. 7A is a diagram illustrating a method of determining a composite focal length in Embodiment 1 of the present invention.

FIG. 7A illustrates a schematic diagram of a main part in which the synchronous light beam deflected for scanning by the optical deflector 5 passes through the imaging lens 6 and is reflected by the synchronous mirror 13 toward the synchronous sensor (not shown).

Here, a point C is an intersection of a straight line L1 connecting knife edge part of the synchronous slit 11 with the center of the synchronous lens 9 (principal ray of the synchronous light beam after being reflected by the synchronous mirror) and the surface of the synchronous mirror 13. Further, a straight line L2 is created by reflecting the straight line L1 by the surface of the synchronous mirror 13. In this case, among arbitrary points on the straight line L2, a point D satisfies the following relationship between a distance (D1) from the first surface of the imaging lens 6 to the imaging lens 6 in the optical axis direction and a distance (D2) from the second surface to the imaging lens 6 in the optical axis direction.

$$D1=D2$$

Figure 7B:
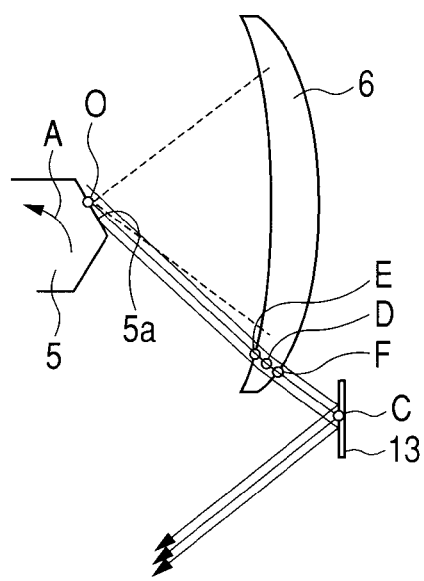
FIG. 7B is a diagram illustrating a method of determining a composite focal length in Embodiment 1 of the present invention.

Further, as illustrated in FIG. 7B, the point E indicates an intersection between the line connecting the point D with an axial deflection point O and the first surface of the imaging lens 6. A point F indicates an intersection between the line connecting the point D with the point C and the second surface of the imaging lens 6.

For determining the composite focal length in this embodiment, it is supposed that the principal ray of the synchronous light beam is guided from the point O that is the axial deflection point to the synchronous mirror 13 via the point E, the point D, the point F, and the point C in the stated order, for convenience sake.

In addition, a method of determining a curvature radius in the main scanning direction on the point E that is the intersection of the principal ray of the synchronous light beam and the first surface of the imaging lens 6 is described below.

FIG. 7C is a schematic diagram of a main part illustrating a method of determining the focal length fg of the optical system for synchronous detection in the main scanning direction.

In FIG. 7C, five points each in the positive direction and in the negative direction are plotted along the lens surface at a pitch of 0.5 mm in the longitudinal direction of the imaging lens 6 (y-axis direction) with respect to the point E as the center. The point train of the total eleven points is referred to as a point train G.

Then, polynomial approximation of the point train G is performed with the following two-dimensional function (see FIG. 7D).

$$X = \alpha Y^2 + \beta Y + \gamma$$

As described above, if the point train G can be approximated in a polynomial manner, a local curvature radius r1 of the point E in the main scanning section can be determined by the following equation.

$$r1 = \frac{\left\{1 + \left(\frac{dX}{dY}\right)^2\right\}^{\frac{3}{2}}}{\left(\frac{d^2 X}{dY^2}\right)} \quad \text{Equation 7}$$

In addition, similarly to the above description, points around a point F that is a principal ray passing point on the second surface of the imaging lens 6 are also plotted and the polynomial approximation is performed so that a local curvature radius r2 of the point F in the main scanning section can also be determined.

In this case, the focal length fc of the imaging lens 6 within the region where the synchronous light beam passes through in the main scanning section is determined based on paraxial theory as follows. Note that a refractive index of the material of the imaging lens 6 is denoted by N, and that a length of the line connecting the point E with the point F is denoted by |EF|.

$$fc = \frac{1}{\varphi 1 + (1 - e1' \cdot \varphi 1) \cdot \varphi 2} \quad \text{Equation 8}$$

$$\begin{cases} \varphi 1 = \frac{N-1}{r1} \\ \varphi 2 = \frac{1-N}{r2} \\ e1' = \frac{|EF|}{N} \end{cases}$$

Moreover, the intersection of the principal ray L1 of the synchronous light beam after being reflected by the synchronous mirror 13 and the first surface of the synchronous lens 9 is regarded as a point H. Then, the composite focal length fg of the imaging lens 6 and the synchronous lens 9 is determined by the following equation in this embodiment.

$$fg = \frac{fc \times fb}{fc + fb - (|FC| + |CH|)} \quad \text{Equation 9}$$

Here, the composite focal length fg corresponds to the focal length of the optical system for synchronous detection from the optical deflector 5 to the synchronization detection element (synchronous sensor) 10BK. In addition, fb denotes the focal length of the single optical element for synchronous detection (synchronous lens) 9BK.

Values that are calculated from the optical parameters in this embodiment are as follows.
(For Black Color (BK))
r1=255 mm
r2=−6000 mm
N=1.527,
|EF|=4.5 mm
|FC|=65.2 mm
|CH|=110 mm
fb=158.649 mm
Therefore, the following is calculated.

fgBK=164.5 mm

Here, the focal length fBK of the imaging optical system 15BK for black color is 200 mm (scanning lens fp in Table 1), and the focal length fgBK of the optical system for synchronous detection is 164.5 mm.
(For Other Colors (Y, M, and C))
r1=255 mm
r2=−6000 mm
N=1.527
|EF|=4.5 mm
|FC|=65.2 mm
|CH|=110 mm
fb=32.753 mm
Therefore, the following is calculated.

fgs=47.3 mm

Here, the focal length fs of the imaging optical systems for Y, M, and C is 200 mm (scanning lens fp in Table 1), and the focal length fgs=fg of the optical system for synchronous detection is 47.3 mm.

Therefore, a ratio of the focal length of the imaging optical system to the focal length of the optical system for synchronous detection is calculated as follows. In the optical scanning device SBK on the black color (BK) side, the ratio is calculated as follows.

fBK/fgBK=1.22

In the optical scanning device SY on the yellow (Y) side, the ratio is calculated as follows.

fs/fgs=4.23

The values satisfy the conditional expressions (1) and (2) described above. Further, also in the individual optical scanning devices SY, SM, SC, and SBK, the conditional expressions (3) and (4) described above are satisfied.

Thus, this embodiment has the structure in which a color displacement amount is controlled to be small while an increase in a size of the whole device is avoided.

As described above, the focal length of the optical system for synchronous detection for black color in the main scanning section in this embodiment is as follows.

$fgBk(BK)=164.5$ mm

In addition, as described above, the focal lengths of the optical systems for synchronous detection for other colors in the main scanning section are as follows.

$fgs(Y)=47.3$ mm $fgs(M)=47.3$ mm $fgs(C)=47.3$ mm

Therefore, ratios of the focal length fgBk of the optical system for synchronous detection for black color in the main scanning section to the focal lengths fgs of the optical systems for synchronous detection for other colors in the main scanning section are determined as follows.

$fgBk(BK)/fgs(Y)=3.5$ $fgBk(BK)/fgs(M)=3.5$ $fgBk(BK)/fgs(C)=3.5$

In this embodiment, the ratios of the focal length fgBk of the optical system for synchronous detection for black color in the main scanning section to the focal lengths fgs of the optical systems for synchronous detection for other colors in the main scanning section are set so as to satisfy the following condition.

$$1<fgBk/fgs<6.0 \quad (5)$$

More specifically, $$1<fgBk/fgs<5.0 \quad (5a)$$

Therefore, as described above, the focal length f (200 mm) in the main scanning section of the imaging optical system is constant among the plurality of the optical scanning devices SY, SM, SC, and SBK, and hence it is understood that the conditional expression (2) described above is also satisfied.

Thus, in this embodiment, the color displacement amount can be controlled to be small while an increase in a size of the whole optical scanning device is avoided.

In this embodiment, as illustrated in FIG. 2, the optical scanning device SBK for black color is disposed at the end portion among the plurality of optical scanning devices SY, SM, SC, and SBK. Note that the optical scanning device SBK for black color is disposed at the rightmost side of the figure in this embodiment, but the optical scanning device SBK may be disposed on the opposite side (at the leftmost side of the figure).

Thus, even if a size of one optical scanning device increases, the four photosensitive drums can be disposed with the same space. As a result, the whole optical scanning device can be downsized.

From the above-mentioned results, as an effect of this embodiment, the write start misregistration on the photosensitive drum surface is reduced in the optical scanning device SBK on the black color (BK) side. Thus, the image forming apparatus in which a small color displacement amount and downsizing are both realized can be provided.

In this embodiment, the four color toner images are superimposed so that the color image forming apparatus is structured. However, this structure should not be interpreted as a limitation. The present invention can be applied to superimposing of a plurality of colors other than the four colors.

In addition, the light beam from the light source unit 1 may be guided to the optical deflector 5 directly via the aperture stop 2 without using the collimator lens 3, the cylindrical lens 4, and the like.

In addition, the imaging optical system includes two lenses in this embodiment, but the imaging optical system may include a single lens or of three or more lenses.

In addition, this embodiment describes the case where the polygon mirror has five deflection surfaces, but this structure should not be interpreted as a limitation. The same effect can be obtained if the polygon mirror has three or more deflection surfaces (e.g., four, six, seven surfaces).

Note that the rotation polygon mirror is used as the deflection unit 5 in this embodiment. However, a reciprocating deflection element having a mirror surface on one side or both sides may be used, in which the deflection surface 5a is moved in a reciprocating manner about a rotation axis orthogonal to the main scanning section so that the deflection for scanning of the light beam is performed toward the scanned surface 8.

In addition, the optical deflector 5 is rotated clockwise in this embodiment, but this structure should not be interpreted as a limitation. Even if the optical deflector 5 is rotated counterclockwise, the same effect can be obtained. However, also in this case, the synchronous light beam to be used should be a part deviating from the light beam for image formation on the "upstream side", i.e., on the starting side of writing the image with respect to the direction B in which the light spot formed on the scanned surface 8 is scanned.

In addition, the optical system for synchronous detection in this embodiment includes a part of the imaging optical system (imaging lens 6), but this structure should not be interpreted as a limitation. The imaging optical system may not be passed through.

EMBODIMENT 2

Figure 8:
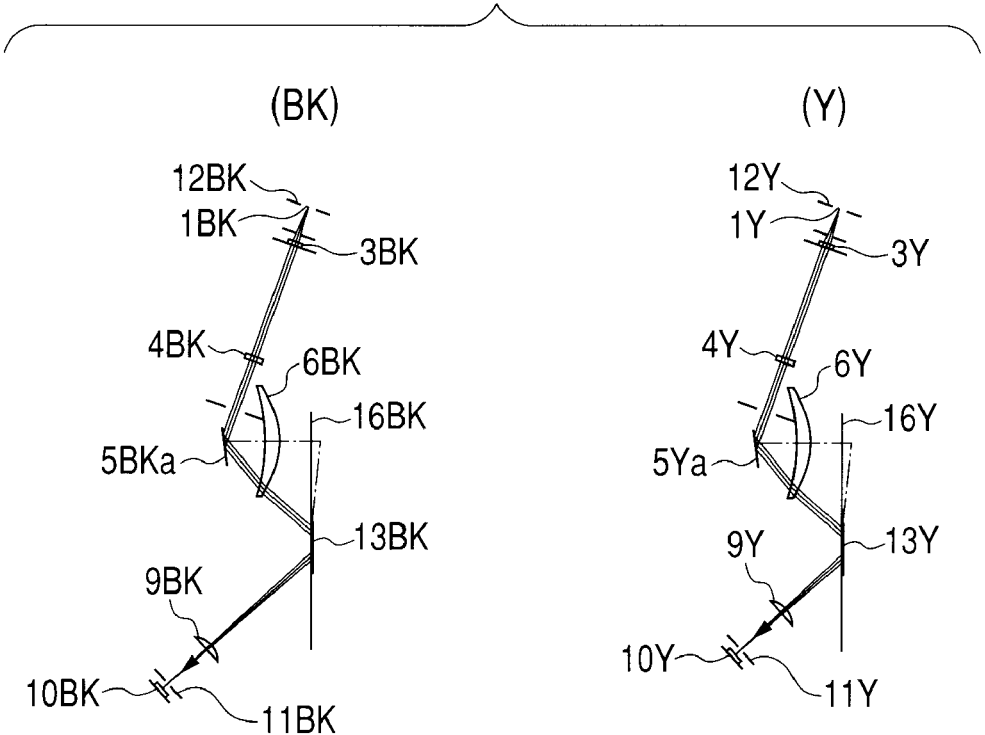
FIG. 8 illustrates a main scanning section of an optical system for synchronous detection of Embodiment 2 of the present invention.
Figure 9:
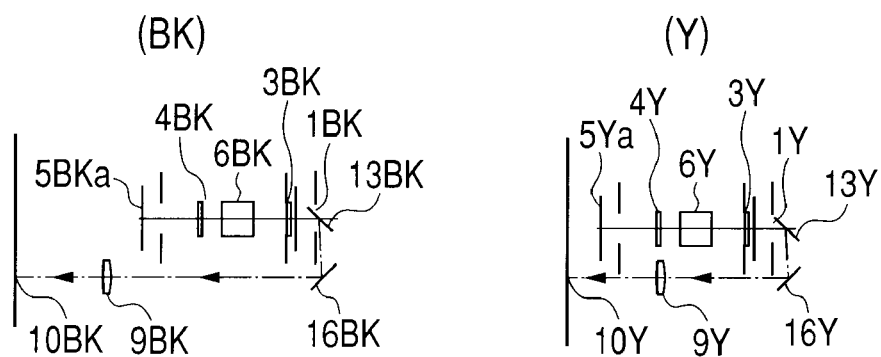
FIG. 9 illustrates a sub scanning section of the optical system for synchronous detection of Embodiment 2 of the present invention.

FIG. 8 illustrates the main scanning sections of the optical systems for synchronous detection of the optical scanning device SBK for black color and the optical scanning device SY for yellow color according to Embodiment of the present invention. FIG. 9 illustrates the sub scanning sections of the optical systems for synchronous detection of the optical scanning device SBK for black color and the optical scanning device SY for yellow color according to Embodiment 2 of the present invention. In FIGS. 8 and 9, the same element as illustrated in FIGS. 5 and 6 is denoted by the same reference numeral.

This embodiment is different from Embodiment 1 described above in that the synchronous lens 9 (9BK or 9Y) having the same shape is used in each of the optical systems for synchronous detection of the optical scanning device SBK for black color and the optical scanning device SY for yellow color. Other structures and optical actions are the same as those described in Embodiment 1, and hence similar effects can be obtained.

In this embodiment, the synchronous slit 11 (11BK or 11Y) is disposed at the position that is optically equivalent to the position of the scanned surface 8 (8BK or 8Y).

Hereinafter, optical parameters in the optical scanning device SBK for black color and the optical scanning device SY for yellow color are shown in Tables 4, 5 and 6.

TABLE 4

| Wavelength, refractive index | | |
|---|---|---|
| Wavelength to be used (nm) | λ | 670 |
| Refractive index of scanning lenses 6 and 7 | Nd | 1.531 |
| Abbe number of scanning lenses 6 and 7 | νd | 55.5 |
| Refractive index of BD lens | Nd | 1.492 |
| Abbe number of BD lens | νd | 57.9 |
| Polygon | | |
| The number of surfaces | n | 5 |
| Diameter of circumcircle (mm) | φ | 34 |
| Angle of light beam | | |
| Incident angle at optical deflector in main scanning direction (degrees) | αm | 70 |
| Incident angle at optical deflector in sub-scanning direction (degrees) | αs | 0 |
| Maximum emerging angle from optical deflector in main scanning direction (degrees) | θ | ±48 |
| Synchronous detection angle (degrees) | θbd | −26.5 |
| Location | | |
| Deflection surface to first surface of scanning lens on optical deflector side (mm) | d01 | 26.5 |
| Thickness of scanning lens on optical deflector side (mm) | d12 | 9.6 |
| Second surface of scanning lens on optical deflector side to third surface of scanning lens on scanned surface side (mm) | d23 | 67.9 |
| Thickness of scanning lens on scanned surface side (mm) | d34 | 5.5 |
| Fourth surface of scanning lens on scanned surface side to scanned surface (mm) | d45 | 126.5 |
| Maximum effective diameter of scanning lens on optical deflector side (mm) | Y1max | 65.4 |
| Maximum effective diameter of scanning lens on scanned surface side (mm) | Y2max | 179.1 |
| Focal length of scanning lens (mm) | fp | 200 |
| Convergence degree of collimator | r0 | 1.00E+30 |
| Optical deflector to natural convergence point (mm) | | |
| Fourth surface of scanning lens on scanned surface side to bending mirror 16BK surface (mm) | d56bk | 40 |
| Fourth surface of scanning lens on scanned surface side to bending mirror 16Y, 16M or 16C surface (mm) | d56ymc | 44.2 |
| Bending mirror 16BK surface to bending mirror 17BK surface (mm) | d67bk | 31.3 |
| Bending mirror 17BK surface to bending mirror 18BK surface (mm) | d78bk | 44.9 |
| Location of BD optical system | | |
| Optical path length from bending mirror surface to BD mirror surface [for BK] (mm) | t01bk | 25.2 |
| Optical path length from bending mirror surface to BD mirror surface [for Y, M, and C] (mm) | t01ymc | 21 |
| Optical path length from BD mirror surface to first surface of BD lens [for BK] (mm) | t12bk | 87.4 |
| Optical path length from BD mirror surface to first surface of BD lens [for Y, M, and C] (mm) | t12ymc | 51.8 |
| Thickness of BD lens (mm) | d89 | 3.5 |
| Optical path length from second surface of BD lens to BD slit [for BK] (mm) | t12bk | 26.5 |
| Optical path length from second surface of BD lens to BD slit [for Y, M, and C] (mm) | t12ymc | 27.4 |
| BD slit to BD sensor [for BK] (mm) | d910bk | 10 |
| BD slit to BD sensor [for Y, M, and C] (mm) | d910ymc | 10 |

TABLE 5

| Surface shape of scanning lens on optical deflector side | | | | | Surface shape of scanning lens on scanned surface side | | | |
|---|---|---|---|---|---|---|---|---|
| | First surface | | Second surface | | | Third surface | | Fourth surface | |
| | Scanning start side (s) | Scanning end side (e) | Scanning start side (s) | Scanning end side (e) | | Scanning start side (s) | Scanning end side (e) | Scanning start side (s) | Scanning end side (e) |
| R | −7.12E+01 | −7.12E+01 | −4.16E+01 | −4.16E+01 | R | −8.24E+02 | −8.24E+02 | 7.68E+02 | 7.68E+02 |
| K | 2.18E+00 | 2.18E+00 | 6.43E−02 | 6.43E−02 | K | 0.00E+00 | 0.00E+00 | −5.90E+02 | −5.90E+02 |
| B4 | 3.69128E−06 | 3.69128E−06 | 2.77878E−06 | 2.77878E−06 | B4 | 0 | 0 | −2.57008E−07 | −2.57008E−07 |
| B6 | 8.27275E−11 | 8.27275E−11 | 1.1798E−09 | 1.1798E−09 | B6 | 0 | 0 | 2.17131E−11 | 2.17131E−11 |
| B8 | 1.95633E−13 | 1.95633E−13 | 2.1027E−13 | 2.17551E−13 | B8 | 0 | 0 | −1.47843E−15 | −1.47843E−15 |
| B10 | 3.54758E−17 | 3.54758E−17 | 2.07452E−16 | 2.02442E−16 | B10 | 0 | 0 | 4.78126E−20 | 4.78126E−20 |
| r | −1.00E+03 | −1.00E+03 | −1.00E+03 | −1.00E+03 | r | −1.00E+02 | −1.00E+02 | −2.36E+01 | −2.36E+01 |
| D2 | 0 | 0 | 0 | 0 | E2 | 0 | 2.45E−06 | 7.12999E−05 | 0.000124271 |
| D4 | 0 | 0 | 0 | 0 | E4 | 0 | −1.68E−10 | −1.56148E−08 | −1.47169E−08 |
| D6 | 0 | 0 | 0 | 0 | E6 | 0 | 0 | 2.05495E−12 | 2.74013E−12 |
| D8 | 0 | 0 | 0 | 0 | E8 | 0 | 0 | −1.46632E−16 | −2.99548E−16 |
| D10 | 0 | 0 | 0 | 0 | E10 | 0 | 0 | 4.25621E−12 | 1.07355E−20 |

TABLE 6

Surface shape of BD lens (for BK)

| | First surface | | Second surface | |
|---|---|---|---|---|
| | Scanning start side (s) | Scanning end side (e) | Scanning start side (s) | Scanning end side (e) |
| R | 17.43 | 17.43 | 1.00E+30 | 1.00E+30 |
| K | 0 | 0 | 0 | 0 |
| B4 | 0 | 0 | 0 | 0 |
| B6 | 0 | 0 | 0 | 0 |
| B8 | 0 | 0 | 0 | 0 |
| B10 | 0 | 0 | 0 | 0 |
| r | 17.43 | 17.43 | −32.0 | −32.0 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

Surface shape of BD lens (for Y, M, and C)

| | First surface | | Second surface | |
|---|---|---|---|---|
| | Scanning start side (s) | Scanning end side (e) | Scanning start side (s) | Scanning end side (e) |
| R | 17.43 | 17.43 | 1.00E+30 | 1.00E+30 |
| K | 0 | 0 | 0 | 0 |
| B4 | 0 | 0 | 0 | 0 |
| B6 | 0 | 0 | 0 | 0 |
| B8 | 0 | 0 | 0 | 0 |
| B10 | 0 | 0 | 0 | 0 |
| r | 17.43 | 17.43 | −32.0 | −32.0 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

Values that are calculated from the optical parameters in this embodiment are as follows.

(For Black Color (BK))
$r1 = 255$ mm
$r2 = -6000$ mm
$N = 1.527$,
$|EF| = 4.5$ mm
$|FC| = 65.2$ mm
$|CH| = 87.4$ mm
$fb = 35.681$ mm
Therefore, the following is calculated.

$$fgBK = 47.7 \text{ mm}$$

Here, the focal length fBK of the imaging optical system 15BK for black color is 200 mm (scanning lens fp in Table 4), and the focal length fgBK of the optical system for synchronous detection is 47.7 mm.

(For Other Colors (Y, M, and C))
$r1 = 255$ mm
$r2 = -6000$ mm
$N = 1.527$
$|EF| = 4.5$ mm
$|FC| = 65.2$ mm
$|CH| = 51.8$ mm
$fb = 35.681$ mm
Therefore, the following is calculated.

$$fgs = 43.3 \text{ mm}$$

Here, the focal length fs of the imaging optical systems for Y, M, and C is 200 mm (scanning lens fp in Table 4), and the focal length fgs=fg of the optical system for synchronous detection is 43.3 mm.

Therefore, a ratio of the focal length of the imaging optical system to the focal length of the optical system for synchronous detection is calculated as follows. In the optical scanning device SBK on the black color (BK) side, the ratio is calculated as follows.

$$fBK/fgBK = 4.19$$

In the optical scanning device SY on the yellow (Y) side, the ratio is calculated as follows.

$$fs/fgs = 4.62$$

The values satisfy the conditional expressions (1) and (2) described above. Further, also in the individual optical scanning devices SY, SM, SC, and SBK, the conditional expressions (3) and (4) described above are satisfied.

Thus, this embodiment has the structure in which a color displacement amount is controlled to be small while an increase in a size of the whole device is avoided.

As described above, the focal length of the optical system for synchronous detection for black color in the main scanning section in this embodiment is as follows.

$$fgBk(BK) = 47.7 \text{ mm}$$

In addition, as described above, the focal lengths of the optical systems for synchronous detection for other colors in the main scanning section are as follows.

$$fgs(Y) = 43.3 \text{ mm}$$

$$fgs(M) = 43.3 \text{ mm}$$

$$fgs(C) = 43.3 \text{ mm}$$

Therefore, ratios of the focal length fgBk of the optical system for synchronous detection for black color in the main scanning section to the focal lengths fgs of the optical systems for synchronous detection for other colors in the main scanning section are determined as follows.

$$fgBk(BK)/fgs(Y) = 1.1$$

$$fgBk(BK)/fgs(M) = 1.1$$

$$fgBk(BK)/fgs(C) = 1.1$$

This satisfies the above-mentioned conditional expression (2).

Therefore, as described above, the focal length f (200 mm) in the main scanning section of the imaging optical system is constant among the plurality of the optical scanning devices SY, SM, SC, and SBK, and hence it is understood that the conditional expression (2) described above is also satisfied.

Thus, in this embodiment, the color displacement amount can be controlled to be small while an increase in a size of the whole optical scanning device is avoided.

From the above-mentioned results, as an effect of this embodiment, the write start misregistration on the photosensitive drum surface is reduced in the optical scanning device SBK on the black color (BK) side. Thus, the color image forming apparatus in which a small color displacement amount and downsizing are both realized can be provided.

Thus, as an advantage unique to this embodiment, the synchronous lens 9 (9BK or 9Y) having the same shape is used in each of the optical systems for synchronous detection of the optical scanning device SBK for black color and the optical scanning device SY for yellow color, and hence procurement of components becomes easy.

In addition, compared with the case where different synchronous lenses are used for different optical scanning devices, there is no possibility of assembly error at the time of assembly. Therefore, a yield rate can be improved.

Embodiment 3

Next, Embodiment 3 of the present invention is described.

Figure 10:
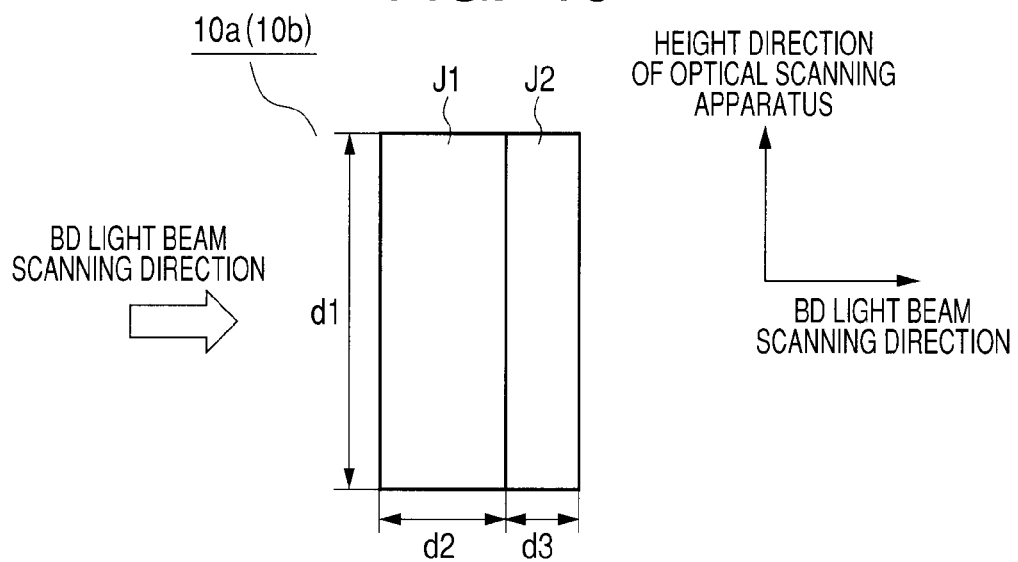
FIG. 10 is a diagram illustrating a light receiving surface of a synchronous sensor of Embodiment 3 of the present invention.

FIG. 10 illustrates a cross section of a main part of the light receiving surface of the synchronization detection element according to Embodiment 3 of the present invention.

This embodiment is different from Embodiments 1 and 2 described above in that a synchronous sensor 10a (10b) having two light receiving surfaces is used for the synchronization detection element, and that the slit for synchronous detection (synchronous slit) is eliminated instead. Other structures and optical actions are the same as those described in Embodiments 1 and 2, and hence similar effects can be obtained.

Specifically, in this embodiment, the synchronous sensor 10a (10b) includes two light receiving surfaces J1 and J2 as illustrated in FIG. 10, and the two light receiving surfaces J1 and J2 are disposed side by side in the direction of scanning the light beam for synchronous detection (synchronous light beam) on the synchronous sensor 10a (10b).

Here, a method of detecting synchronous detection timing in the synchronous sensor 10a (10b) according to this embodiment is described below.

In this embodiment, if the synchronous light beam is scanned in the direction illustrated in FIG. 10 for example, the synchronous light beam first reaches the light receiving surface J1 and then reaches the light receiving surface J2. Therefore, considering the light amount received by the light receiving surface J1 and the light receiving surface J2 in a time series, there is inevitably one point of timing at which the retrieving light amount becomes the same on the light receiving surface J1 and on the light receiving surface J2. This timing is regarded as the synchronous detection timing in this embodiment.

Hereinafter, optical parameters in the optical scanning device SBK for black color and the optical scanning device SY for yellow color are shown in Tables 7, 8, and 9.

TABLE 7

| Wavelength, refractive index | | |
|---|---|---|
| Wavelength to be used (nm) | λ | 670 |
| Refractive index of scanning lenses 6 and 7 | Nd | 1.531 |
| Abbe number of scanning lenses 6 and 7 | vd | 55.5 |
| Refractive index of BD lens | Nd | 1.492 |
| Abbe number of BD lens | vd | 57.9 |
| Polygon | | |
| The number of surfaces | n | 5 |
| Diameter of circumcircle (mm) | φ | 34 |
| Angle of light beam | | |
| Incident angle at optical deflector in main scanning direction (degrees) | am | 70 |
| Incident angle at optical deflector in sub-scanning direction (degrees) | as | 0 |
| Maximum emerging angle from optical deflector in main scanning direction (degrees) | θ | ±48 |
| Synchronous detection angle (degrees) | θbd | −26.5 |
| Location | | |
| Deflection surface to first surface of scanning lens on optical deflector side (mm) | d01 | 26.5 |
| Thickness of scanning lens on optical deflector side (mm) | d12 | 9.6 |
| Second surface of scanning lens on optical deflector side to third surface of scanning lens on scanned surface side (mm) | d23 | 67.9 |
| Thickness of scanning lens on scanned surface side (mm) | d34 | 5.5 |
| Fourth surface of scanning lens on scanned surface side to scanned surface (mm) | d45 | 126.5 |
| Maximum effective diameter of scanning lens on optical deflector side (mm) | Y1max | 65.4 |
| Maximum effective diameter of scanning lens on scanned surface side (mm) | Y2max | 179.1 |
| Focal length of scanning lens (mm) | fp | 200 |
| Convergence degree of collimator | r0 | 1.00E+30 |
| Optical deflector to natural convergence point (mm) | | |
| Fourth surface of scanning lens on scanned surface side to bending mirror 16BK surface (mm) | d56bk | 40 |
| Fourth surface of scanning lens on scanned surface side to bending mirror 16Y, 16M or 16C surface (mm) | d56ymc | 44.2 |
| Bending mirror 16BK surface to bending mirror 17BK surface (mm) | d67bk | 31.3 |
| Bending mirror 17BK surface to bending mirror 18BK surface (mm) | d78bk | 44.9 |
| Location of BD optical system | | |
| Optical path length from bending mirror surface to BD mirror surface [for BK] (mm) | t01bk | 25.2 |
| Optical path length from bending mirror surface to BD mirror surface [for Y, M, and C] (mm) | t01ymc | 21 |
| Optical path length from BD mirror surface to first surface of BD lens [for BK] (mm) | t12bk | 87.4 |
| Optical path length from BD mirror surface to first surface of BD lens [for Y, M, and C] (mm) | t12ymc | 51.8 |
| Thickness of BD lens (mm) | d89 | 3.5 |
| Optical path length from second surface of BD lens to BD sensor [for BK] (mm) | t12bk | 26.5 |
| Optical path length from second surface of BD lens to BD sensor [for Y, M, and C] (mm) | t12ymc | 27.4 |

TABLE 8

| | Surface shape of scanning lens on optical deflector side | | | |
|---|---|---|---|---|
| | First surface | | Second surface | |
| | Scanning start side (s) | Scanning end side (e) | Scanning start side (s) | Scanning end side (e) |
| R | −7.12E+01 | −7.12E+01 | −4.16E+01 | −4.16E+01 |
| K | 2.18E+00 | 2.18E+00 | 6.43E−02 | 6.43E−02 |
| B4 | 3.69128E−06 | 3.69128E−06 | 2.77878E−06 | 2.77878E−06 |
| B6 | 8.27275E−11 | 8.27275E−11 | 1.1798E−09 | 1.1798E−09 |
| B8 | 1.95633E−13 | 1.95633E−13 | 2.1027E−13 | 2.17551E−13 |
| B10 | 3.54758E−17 | 3.54758E−17 | 2.07452E−16 | 2.02442E−16 |

TABLE 8-continued

| r | −1.00E+03 | −1.00E+03 | −1.00E+03 | −1.00E+03 |
|---|---|---|---|---|
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

Surface shape of scanning lens on scanned surface side

| | Third surface | | Fourth surface | |
|---|---|---|---|---|
| | Scanning start side (s) | Scanning end side (e) | Scanning start side (s) | Scanning end side (e) |
| R | −8.24E+02 | −8.24E+02 | 7.68E+02 | 7.68E+02 |
| K | 0.00E+00 | 0.00E+00 | −5.90E+02 | −5.90E+02 |
| B4 | 0 | 0 | −2.57008E−07 | −2.57008E−07 |
| B6 | 0 | 0 | 2.17131E−11 | 2.17131E−11 |
| B8 | 0 | 0 | −1.47843E−15 | −1.47843E−15 |
| B10 | 0 | 0 | 4.78126E−20 | 4.78126E−20 |
| r | −1.00E+02 | −1.00E+02 | −2.36E+01 | −2.36E+01 |
| E2 | 0 | 2.45E−06 | 7.12999E−05 | 0.000124271 |
| E4 | 0 | −1.68E−10 | −1.56148E−08 | −1.47169E−08 |
| E6 | 0 | 0 | 2.05495E−12 | 2.74013E−12 |
| E8 | 0 | 0 | −1.46632E−16 | −2.99548E−16 |
| E10 | 0 | 0 | 4.25621E−21 | 1.07355E−20 |

TABLE 9

Surface shape of BD lens (for BK)

| | First surface | | Second surface | |
|---|---|---|---|---|
| | Scanning start side (s) | Scanning end side (e) | Scanning start side (s) | Scanning end side (e) |
| R | 17.43 | 17.43 | 1.00E+30 | 1.00E+30 |
| K | 0 | 0 | 0 | 0 |
| B4 | 0 | 0 | 0 | 0 |
| B6 | 0 | 0 | 0 | 0 |
| B8 | 0 | 0 | 0 | 0 |
| B10 | 0 | 0 | 0 | 0 |
| r | 17.43 | 17.43 | −32.0 | −32.0 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

Surface shape of BD lens (for Y, M, and C)

| | First surface | | Second surface | |
|---|---|---|---|---|
| | Scanning start side (s) | Scanning end side (e) | Scanning start side (s) | Scanning end side (e) |
| R | 17.43 | 17.43 | 1.00E+30 | 1.00E+30 |
| K | 0 | 0 | 0 | 0 |
| B4 | 0 | 0 | 0 | 0 |
| B6 | 0 | 0 | 0 | 0 |
| B8 | 0 | 0 | 0 | 0 |
| B10 | 0 | 0 | 0 | 0 |
| r | 17.43 | 17.43 | −32.0 | −32.0 |
| D2 | 0 | 0 | 0 | 0 |
| D4 | 0 | 0 | 0 | 0 |
| D6 | 0 | 0 | 0 | 0 |
| D8 | 0 | 0 | 0 | 0 |
| D10 | 0 | 0 | 0 | 0 |

Values that are calculated from the optical parameters in this embodiment are as follows.

(For Black Color (BK))
r1=255 mm
r2=−6000 mm
N=1.527,
|EF|=4.5 mm
|FC|=65.2 mm
|CH|=87.4 mm
fb=35.681 mm
Therefore, the following is calculated.

$fgBK = 47.7$ mm

Here, the focal length fBK of the imaging optical system 15BK for black color is 200 mm (scanning lens fp in Table 7), and the focal length fgBK of the optical system for synchronous detection is 47.7 mm.

(For Other Colors (Y, M, and C))
r1=255 mm
r2=−6000 mm
N=1.527
|EF|=4.5 mm
|FC|=65.2 mm
|CH|=51.8 mm
fb=35.681 mm
Therefore, the following is calculated.

$fgs = 43.3$ mm

Here, the focal length fs of the imaging optical systems for Y, M, and C is 200 mm (scanning lens fp in Table 7), and the focal length fgs=fg of the optical system for synchronous detection is 43.3 mm.

Therefore, a ratio of the focal length of the imaging optical system to the focal length of the optical system for synchronous detection is calculated as follows. In the optical scanning device SBK on the black color (BK) side, the ratio is calculated as follows.

$fBK/fgBK = 4.19$

In the optical scanning device SY on the yellow (Y) side, the ratio is calculated as follows.

$fs/fgs = 4.62$

The values satisfy the conditional expressions (1) and (2) described above. Further, also in the individual optical scanning devices SY, SM, SC, and SBK, the conditional expressions (3) and (4) described above are satisfied.

Thus, this embodiment has the structure in which a color displacement amount is controlled to be small while an increase in a size of the whole device is avoided.

As described above, the focal length of the optical system for synchronous detection for black color in the main scanning section in this embodiment is as follows.

$fgBk(BK) = 47.7$ mm

In addition, as described above, the focal lengths of the optical systems for synchronous detection for other colors in the main scanning section are as follows.

$fgs(Y) = 43.3$ mm $fgs(M) = 43.3$ mm $fgs(C) = 43.3$ mm

Therefore, ratios of the focal length fgBk of the optical system for synchronous detection for black color in the main scanning section to the focal lengths fgs of the optical systems for synchronous detection for other colors in the main scanning section are determined as follows.

$fgBk(BK)/fgs(Y) = 1.1$ $fgBk(BK)/fgs(M) = 1.1$ $fgBk(BK)/fgs(C) = 1.1$

This satisfies the above-mentioned conditional expression (5).

Therefore, as described above, the focal length f (200 mm) in the main scanning section of the imaging optical system is constant among the plurality of the optical scanning devices SY, SM, SC, and SBK, and hence it is understood that the conditional expression (2) described above is also satisfied.

Thus, in this embodiment, the color displacement amount can be controlled to be small while an increase in a size of the whole optical scanning device is avoided.

From the above-mentioned results, as an effect of this embodiment, the write start misregistration on the photosensitive drum surface is reduced in the optical scanning device SBK on the black color (BK) side. Thus, the color image forming apparatus in which a small color displacement amount and downsizing are both realized can be provided.

In addition, an advantage unique to this embodiment is that the synchronous slit can be eliminated so that downsizing and simplification of the whole device can be achieved. In addition, compared with the case where the synchronous slit is used for synchronous detection, the synchronous detection timing can be determined without depending on the scanning speed with the synchronous light beam. Therefore, the synchronous detection can be performed more precisely.

Note that the light source unit includes a single light emission part in Embodiments 1 to 3 described above, but this structure should not be interpreted as a limitation. A multibeam semiconductor laser having a plurality of light emission parts (multibeam light source) may be used for constituting the same, and hence the present invention can be applied in the same manner as Embodiments 1 to 3 described above. One of advantages of using the multibeam light source is that it can support high speed and high definition of printing without increasing speed of the optical deflector that may be a cause of noise and vibration.

In addition, Embodiments 1 to 3 described above have the structure in which the light beam is made incident into a single deflection surface in a single optical deflector, but this structure should not be interpreted as a limitation. Even if the light beam is made incident into a plurality of different deflection surfaces, the present invention can be applied in the same manner as Embodiments 1 to 3 described above. One of advantages of adopting the structure in which the light beam is made incident into a plurality of different deflection surfaces is that the number of optical deflectors can be reduced so that the whole device can be simplified.

Color Image Forming Apparatus

Figure 11:
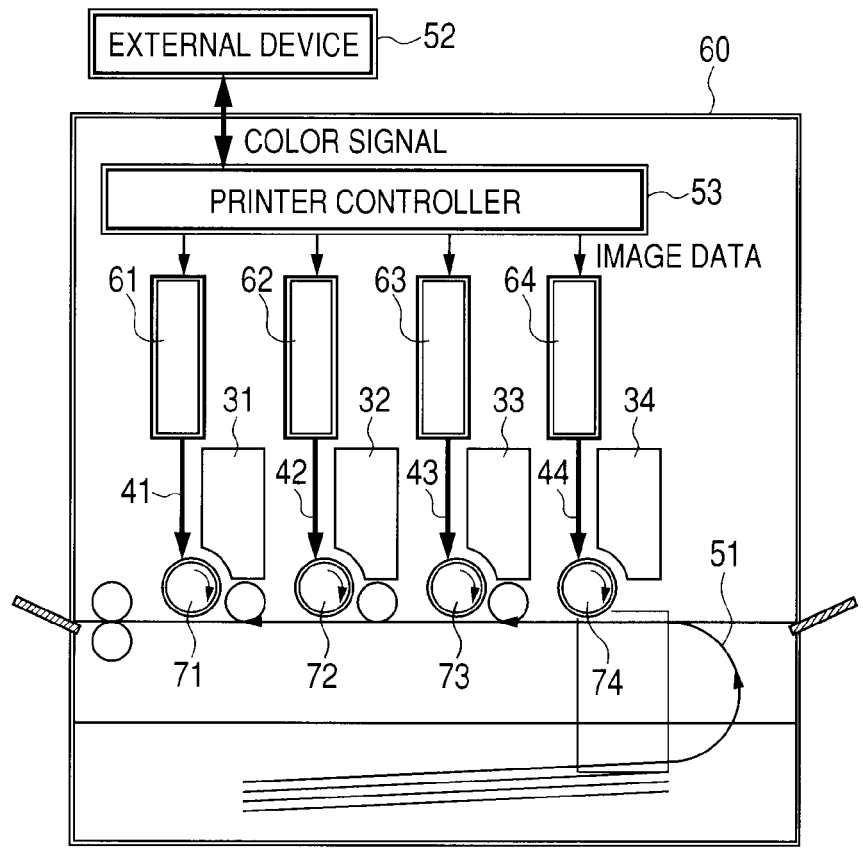
FIG. 11 is a schematic diagram of a main part of a color image forming apparatus of the embodiment of the present invention.
Figure 12A:
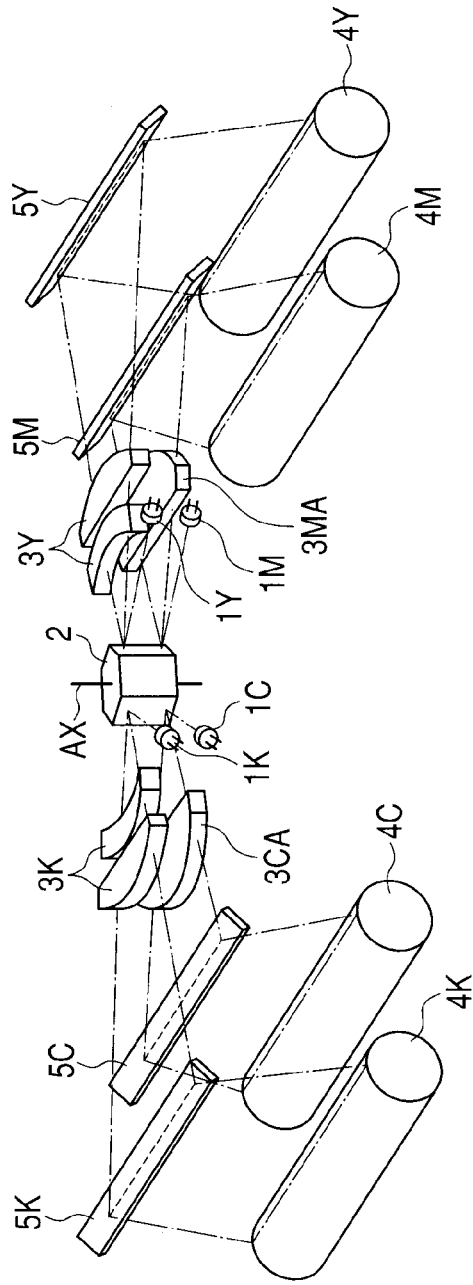
FIGS. 12A and 12B illustrates a scanning cross section of a conventional optical scanning device.
Figure 12B:
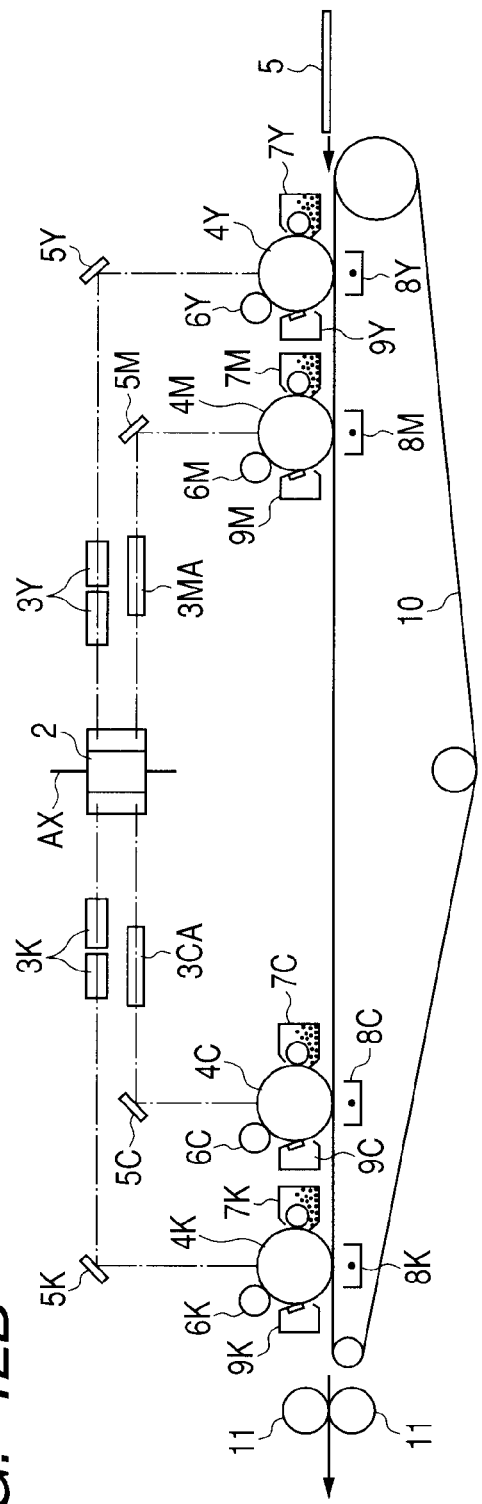

FIG. 11 is a schematic diagram illustrating the main part of a color image forming apparatus according to an embodiment of the present invention. The color image forming apparatus of this embodiment is of tandem type, which has four optical scanning devices (optical scanning systems) arranged side by side to record concurrently image information on surfaces of photosensitive drums, which serve as image bearing bodies. FIG. 11 illustrates the color image forming apparatus 60, the optical scanning devices 61, 62, 63, and 64 structured as illustrated in any one of Embodiments 1 to 3, photosensitive drums 71, 72, 73, and 74 serving as image bearing bodies, developing units 31, 32, 33, and 34, and a conveyor belt 51. It should be noted that in FIG. 11 there are provided a transferring unit (not shown) for transferring a toner image developed by the developing unit onto a transfer material and a fixing device (not shown) for fixing the transferred toner image on the transfer material.

In FIG. 11, respective color signals of red (R), green (G), and blue (B) are input from an external device 52 such as a personal computer to the color image forming apparatus 60. The color signals are converted into pieces of image data (dot data) of cyan (C), magenta (M), yellow (Y), and black (B) by a printer controller 53 in the color image forming apparatus. The respective pieces of image data are input to the optical scanning devices 61, 62, 63, and 64. Light beams 41, 42, 43, and 44, which are modulated according to the respective pieces of image data, are emerged from the optical scanning devices. The photosensitive surfaces of the photosensitive drums 71, 72, 73, and 74 are scanned with the light beams in a main scanning direction.

In the color image forming apparatus of this embodiment, the four optical scanning devices 61, 62, 63, and 64 are arranged side by side, each corresponding to the respective colors of cyan (C), magenta (M), yellow (Y), and black (B). The optical scanning devices concurrently record the image signals (image information) on the surfaces of the photosensitive drums 71, 72, 73, and 74, and print a color image at high speed.

As described above, the color image forming apparatus in this embodiment uses light beams which are respectively based on image data and emerged from the four optical scanning devices 61, 62, 63, and 64 to form latent images of four colors on the photosensitive drums 71, 72, 73, and 74 respectively associated with the four colors. The latent images are then transferred to a recording material one on another through multilayer transfer to form one full color image.

The external device 52 may be, for example, a color image reading device having a CCD sensor. In this case, the color image reading device and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-269549, filed Oct. 20, 2008, which is hereby incorporated by reference herein in its entirety.

What is claimed is:

1. An optical scanning unit comprising a plurality of optical scanning apparatuses each of which includes a light source unit, an incident optical system for allowing a light beam emerging from the light source unit to be made incident into a deflection unit, an imaging optical system for allowing the light beam deflected for scanning by a deflection surface of the deflection unit to be focused on a surface to be scanned, a synchronization detection element for detecting a part of the light beam deflected for scanning by the deflection surface of the deflection unit, and an optical system for synchronous detection for guiding the part of the light beam deflected for scanning by the deflection surface of the deflection unit to the synchronization detection element, wherein a focal length in a main scanning section of an optical system for synchronous detection of an optical scanning apparatus for forming a black color image among the plurality of optical scanning apparatus is denoted by fgBK (mm), and a focal length in the main scanning section of optical system for synchronous detection of optical scanning apparatus for forming color image other than the black color image is denoted by fgs (mm), and then the following condition is satisfied $$fgs < fgBK.$$

2. An optical scanning unit according to claim 1, wherein a focal length in the main scanning section of the imaging optical system of the optical scanning apparatus for forming the black color image among the plurality of optical scanning apparatuses is denoted by fBK (mm), a focal length in the main scanning section of the imaging optical system for forming the color image other than the black color image is denoted by fs (mm), and then the optical scanning apparatus for forming the black color image and the optical scanning apparatus for forming the color image other than the black color image satisfy the following condition $$1.0 < (fs/fgs)/(fBK/fgBK) < 6.0.$$

3. An optical scanning unit according to claim 2, wherein the optical scanning apparatus for forming the black color image and the optical scanning apparatus for forming the color image other than the black color image satisfy the following conditions $$1 < fs/fgs < 10$$

$$1 < fBK/fgBK < 10.$$

4. A color image forming apparatus, comprising:
the optical scanning unit according to claim 1; and
a plurality of photosensitive drums provided to individual surfaces to be scanned of the plurality of optical scanning apparatuses for forming different color images to each other.

5. A color image forming apparatus according to claim 4, further comprising a printer controller for converting a color signal supplied from an external device into image data of different colors, and for supplying the data to the individual plurality of optical scanning devices.

6. An optical scanning unit comprising a plurality of optical scanning apparatuses each of which includes a light source unit, an incident optical system for allowing a light beam emerging from the light source unit to be made incident into a deflection unit, an imaging optical system for allowing the light beam deflected for scanning by a deflection surface of the deflection unit to be focused on a surface to be scanned, a synchronization detection element for detecting a part of the light beam deflected for scanning by the deflection surface of the deflection unit, and an optical system for synchronous detection for guiding the part of the light beam deflected for scanning by the deflection surface of the deflection unit to the synchronization detection element,
wherein a focal length in a main scanning section of an optical system for synchronous detection of an optical scanning apparatus for forming a black color image among the plurality of optical scanning apparatuses is denoted by fgBK (mm), a focal length in the main scanning section of an imaging optical system of the optical scanning apparatus for forming the black color image is denoted by fBK (mm), a focal length in the main scanning section of optical system for synchronous detection of optical scanning apparatus for forming color image other than the black color image is denoted by fgs (mm), and a focal length in the main scanning section of imaging optical system for forming the color image other than the black color image is denoted by fs (mm), and then the following condition is satisfied $$fBK/fgBK < fs/fgs.$$

7. An optical scanning unit according to claim 6, wherein the optical scanning apparatus for forming the black color image and the optical scanning apparatuses for forming the color image other than the black color image satisfy the following condition $$1.0 < (fs/fgs2)/(fBK/fgBK) < 6.0.$$

8. An optical scanning unit according to claim 7, wherein the optical scanning apparatus for forming the black color image and the optical scanning apparatuses for forming the color image other than the black color image satisfy the following conditions $$1 < fs/fgs < 10$$

$$1 < fBK/fgBK < 10.$$

9. An optical scanning unit according to claim 6, wherein optical element for synchronous detection constituting the optical system for synchronous detection of each of the plurality of optical scanning apparatuses has the same optical performance.

10. A color image forming apparatus, comprising:
the optical scanning unit according to claim 6; and
a plurality of photosensitive drums provided to individual scanned surfaces of the plurality of optical scanning devices for forming different color images to each other.

11. A color image forming apparatus according to claim 10, further comprising a printer controller for converting a color signal supplied from an external device into image data of different colors, and for supplying the data to the individual plurality of optical scanning devices.

* * * * *